(12) United States Patent
Diesnis

(10) Patent No.: US 10,065,358 B2
(45) Date of Patent: *Sep. 4, 2018

(54) MACHINE FOR FORMING AND FILLING CONTAINERS COMPRISING A STABILIZATION AREA FOR STABILIZING THE LIQUID INSIDE THE CONTAINERS

(71) Applicant: DISCMA AG, Zürich (CH)

(72) Inventor: Daniel Diesnis, Octeville sur Mer (FR)

(73) Assignee: DISCMA AG, Zürich (CH)

( * ) Notice: Subject to any disclaimer, the term of this patent is extended or adjusted under 35 U.S.C. 154(b) by 169 days.

This patent is subject to a terminal disclaimer.

(21) Appl. No.: 15/030,516

(22) PCT Filed: Oct. 20, 2014

(86) PCT No.: PCT/EP2014/072462
§ 371 (c)(1),
(2) Date: Apr. 19, 2016

(87) PCT Pub. No.: WO2015/059104
PCT Pub. Date: Apr. 30, 2015

(65) Prior Publication Data
US 2016/0250798 A1 Sep. 1, 2016

(30) Foreign Application Priority Data

Oct. 21, 2013 (EP) ..................................... 13306445

(51) Int. Cl.
*B29C 49/36* (2006.01)
*B29C 49/46* (2006.01)
(Continued)

(52) U.S. Cl.
CPC ............ *B29C 49/421* (2013.01); *B29C 49/28* (2013.01); *B29C 49/4205* (2013.01);
(Continued)

(58) Field of Classification Search
CPC .............. B29C 49/4205; B29C 49/421; B29C 2049/4664; B29C 2049/4655; B29C 49/36; B29C 49/46; B65B 3/022; B65B 43/54
(Continued)

(56) References Cited

U.S. PATENT DOCUMENTS 4,487,568 A * 12/1984 Wiatt ...................... B29C 49/28
425/534
4,784,253 A * 11/1988 Gibbemeyer ....... B29C 49/4205
198/418.6
(Continued)

FOREIGN PATENT DOCUMENTS

EP 2279850 A1 2/2011
WO WO-2014124816 A1 * 8/2014 ............. B29C 49/36

*Primary Examiner* — Robert B Davis
(74) *Attorney, Agent, or Firm* — Eric J. Sosenko; Jonathan P. O'Brien; Honigman Miller Schwartz and Cohn LLP

(57) ABSTRACT

A machine to shape from a preform and fill with liquid successive containers in successive molds. The machine defines a first closed loop and includes a plurality of holding devices adapted to hold a neck of a preform or of a container. The holding devices are distributed along the first closed loop and the machine further includes a conveyor adapted to convey the holding device along the first closed loop. The first closed loop including a forming area along which each holing device is integrated in a forming station. The first closed loop also including one straight portion extending substantially rectilinearly.

17 Claims, 8 Drawing Sheets

(51) Int. Cl.
  *B29C 49/42* (2006.01)
  *B65B 3/02* (2006.01)
  *B29C 49/28* (2006.01)
  *B65B 43/54* (2006.01)
  *B29B 11/04* (2006.01)
  *B29C 49/06* (2006.01)
  *B29C 49/12* (2006.01)
  *B29C 49/48* (2006.01)
  *B29C 49/58* (2006.01)
  *B29K 105/00* (2006.01)
  *B29L 31/00* (2006.01)

(52) U.S. Cl.
  CPC ............. *B29C 49/46* (2013.01); *B65B 3/022* (2013.01); *B65B 43/54* (2013.01); *B29B 11/04* (2013.01); *B29B 2911/14506* (2013.01); *B29C 49/06* (2013.01); *B29C 49/12* (2013.01); *B29C 49/36* (2013.01); *B29C 49/4236* (2013.01); *B29C 2049/4221* (2013.01); *B29C 2049/4664* (2013.01); *B29C 2049/4892* (2013.01); *B29C 2049/5831* (2013.01); *B29C 2049/5834* (2013.01); *B29C 2049/5862* (2013.01); *B29K 2105/258* (2013.01); *B29L 2031/712* (2013.01)

(58) Field of Classification Search
  USPC ......................................................... 425/524
  See application file for complete search history.

(56) References Cited

U.S. PATENT DOCUMENTS

| | | |
|---|---|---|
| 8,091,699 B2 | 1/2012 | Gillet et al. |
| 2003/0075839 A1* | 4/2003 | Giacobbe ............ B29C 49/4205<br>264/535 |
| 2004/0047941 A1* | 3/2004 | Salenbien ........... B29C 49/4215<br>425/526 |
| 2012/0207872 A1* | 8/2012 | Lisch ..................... B29C 49/12<br>425/524 |
| 2014/0008927 A1 | 1/2014 | Rousseau et al. |
| 2014/0174034 A1 | 6/2014 | Drenguis et al. |

* cited by examiner

MACHINE FOR FORMING AND FILLING
CONTAINERS COMPRISING A
STABILIZATION AREA FOR STABILIZING
THE LIQUID INSIDE THE CONTAINERS

CROSS REFERENCE TO RELATED
APPLICATIONS

This application is the U.S. national phase of PCT Application No. PCT/EP2014/072462, filed on Oct. 20, 2014, and claims priority to EP13306445.1 filed on Oct. 21, 2013, the disclosures of which are incorporated in their entirety by reference herein.

TECHNICAL FIELD OF THE INVENTION

The present invention relates to a machine for forming and filling containers in particular by injecting a liquid inside successive preforms placed in successive molds.

The invention also relates to a method for forming and filling containers using such a machine.

The invention relates to the field, known as hydro forming, of forming containers from a preform using an incompressible liquid to deform the preform.

In the application, "liquid" has a physical meaning. It designates any incompressible and able to flow medium. The liquid can have a low viscosity (like water or alcohol), a medium viscosity (like edible oil or soup), or a high viscosity (like yogurt or creamy product). The liquid can be homogeneous or not homogeneous (including fruit pulp or bits of foodstuff). It is not limited to foodstuff. The incompressible liquid may be for example water, or other beverages, body care products, home and garden care products, medical fluids, fuels, operating fluids, and the like.

BACKGROUND

In such machines and methods, successive preforms are placed in successive molds and the injection is performed at a container forming wheel, or carousel, movable in rotation and carrying the molds. The injection is performed in a forming area of the machine at a high pressure via injection means coupled to the molds and placed in fluidic communication with the inner volume of the preforms.

At the end of the forming area, the formed and filled containers are retrieved from the forming wheel, by a transferring wheel, and are transferred to a capping wheel, where the containers are closed by caps or lids.

Consequently, the containers are transported at high speed while containing liquid and while being opened. More particularly, the opened containers containing liquid are moved in rotation, which generates an important centrifugal force on the containers. This centrifugal force, and more generally transporting the containers at high speed, can lead to spilling the liquid contained in the containers.

More particularly, when the formed and filled containers move from the forming wheel to the transfer wheel, the direction of rotation of the containers changes, which implies that the centrifugal forces applied by the forming wheel and the centrifugal forces applied by the transferring wheel are of opposite signs, which generates very important constraints on the formed containers. Such constraints applied by the liquid on the containers while they move at high speed can lead to a deformation or even a destruction of some of the containers, thereby spilling the content of these containers in the machine. There is therefore a high risk of soiling the machine with liquid, which requires stopping the machine to clean it and reduces the throughput of the machine.

Document WO-2012/156014 discloses a machine for forming and filling containers, wherein the opened and filled containers are separated from injection nozzles while the molds are placed in a retracted position away from the injection nozzles. In this manner, if liquid is spilled out of the containers, said liquid will not soil the molds, which reduces the need to clean the machine. However, such a machine does not prevent the spilling of the content of the containers. Such a machine is therefore not satisfactory since a part of the liquid injected in the containers is lost.

Consequently, in order to prevent any spilling the speed of rotation of the different wheels of the machine is necessarily limited, thereby limiting the throughput of the machine.

One of the aims of the invention is to overcome the drawbacks mentioned above, by proposing a machine and a method for forming and filling containers, wherein opened and filled containers can be transported without risking spilling the content of the containers.

SUMMARY OF THE INVENTION

To this end, the invention relates to a machine for forming and filling containers of the type adapted to shape from a preform and fill with liquid successive containers in successive molds, said machine defining at least a first closed loop, and comprising a plurality of holding means, each holding means being adapted to hold a neck of a preform or of a formed and filled container, the holding means being distributed along said first closed loop, the machine further comprising conveying means adapted to convey the holding means along said first closed loop in a conveying direction, said first closed loop comprising a forming area along which each holding means circulating in said forming area is integrated in a forming station, said forming station comprising a mold, receiving a preform held by said holding means, and injection means adapted to inject a liquid inside the held preform such that the held preform is shaped into a container, wherein the first closed loop comprises at least one straight portion extending substantially rectilinearly.

The machine according to the invention is arranged such that the opened formed and filled containers circulate on the straight portion, i.e. along a substantially rectilinear path. Consequently, the machine comprises a stabilization area wherein the liquid inside the containers is not subjected to centrifugal forces and has time to settle inside the containers. The formed and filled containers can therefore be transported to a capping station without risking spilling the content of the containers in the machine. Since the wheels of the machine do not carry containers while they are opened and filled, the rotation speed of these wheels is not limited by the risk of spilling the content of the containers and the throughput of the machine can be increased.

To this end, according to other features of the machine according to the invention:
  the straight portion of the first closed loop is arranged such that the formed and filled containers are circulated on said straight portion, and
  the straight portion of the first closed loop extends at least in part downstream of the forming area.

According to other features of the machine according to the invention:
  the first closed loop comprises at least a separation area, wherein each container formed and filled inside a mold is separated from said mold, said separation area being arranged directly upstream or directly downstream of the straight portion; and the separation area comprises a separation point, downstream of which the molds and the filled containers circulate along different paths, said separation point being formed by the upstream end or by the downstream the end of the straight portion of the first closed loop.

The separation between the opened and filled containers and the molds inside which they have been formed occurs directly upstream of the straight portion or downstream of the straight portion, meaning that the opened and filled containers circulate on the straight portion immediately after being formed and filled. The formed and filled containers therefore circulate in the stabilization area either inside the molds inside which they were formed or outside said molds but immediately after being filled, which prevents risks of spilling the content of the containers.

According to a particular feature of the machine according to the invention, said holding means are arranged to hold each container at least in the vicinity of its neck and at least in the vicinity of its bottom, at least when said holding means circulate on the straight portion of the first closed loop.

By holding the filled and opened containers by their neck and bottom, while they are transported in the straight portion of the machine, the force applied by the liquid on the container does not imply a risk of deforming or destroying the containers even if the containers circulate at a high speed in the straight portion of the machine. The throughput of the machine can therefore be increased by increasing the transportation speed of the containers.

According to a particular feature of the machine according to the invention, the first closed loop comprises a circular portion upstream of the straight portion, said straight portion extending according to a direction forming a tangent of the circular portion at the junction between the circular portion and the straight portion.

By making the transition between the circular portion and the straight portion tangential to circular portion, the transition between these portions limits the acceleration imparted on the containers and stops suddenly the centrifugal force imparted on the containers, thereby limiting the constraints applied on the containers and limiting the risks of spilling or of breakage of the containers.

According to a particular embodiment of the machine according to the invention, the forming stations are distributed along the entire first closed loop.

By distributing the forming stations all along the first closed loop, the forming area can be increased, meaning that the number of stations performing the forming and filling steps of the containers at the same time can be larger than in a conventional machine, wherein the forming stations perform the forming and filling steps on only part of a circular portion of a forming wheel. In this embodiment, the mold may comprise a receiving surface forming a neck seat which constitutes the holding means.

According to other particular embodiments of the machine according to the invention:

the injection means are distributed along a second closed loop, said second closed loop and the first closed loop comprising at least one common part, said common part defining the forming area;

the molds are distributed along the entire first closed loop, the molds being coupled to the injection means in the forming area and being separated from said injection means outside said forming area; and the holding means are constituted by a part of the mold.

By distributing the injection means on a second closed loop, it is possible to limit the weight of the elements transported on the first closed loop, thereby simplifying the structure of the machine, and in particular the means for carrying the elements transported on the first closed loop. The injection means are carried on a simple wheel, which is less problematic than having to carry the injection means all along the first closed loop.

According to other features of the machine according to the invention:

the molds are distributed along the second closed loop and remain coupled to the injection means along said second closed loop, the preforms being received by the molds at one end of the forming area and the formed and filled containers being separated from said molds at the other end of said forming area;

the first closed loop comprises:
a first circular portion forming at least a part of the forming area,
a first straight portion extending downstream of the first circular portion,
a second circular portion extending downstream of the first straight portion, and
a second straight portion extending between the second circular portion and the first circular portion,
the machine further comprising an exit conveyor located in an exit area of the machine and adapted to extract formed and filled containers from the first closed loop;

the exit conveyor comprises a substantially rectilinear portion aligned with the straight portion;

and/or wherein the exit area is located at the junction between the straight portion and the second circular portion of the first closed loop;

the conveying means are adapted to convey the holding means with a constant pitch along the first closed loop, or with a predetermined variation of pitch along the first closed loop;

and/or wherein the conveying means comprise a plurality of mechanical links connecting two adjacent holding means such that the plurality of holding means and the plurality of mechanical links form a deformable chain extending along the first closed loop;

and/or wherein the conveying means comprise at least a fix magnetic path extending along at least a magnetic portion of the first closed loop, each of the holding means being carried by an independent carrier adapted to be driven magnetically along the fix magnetic path; and the first circular portion and the second circular portion are each formed by part of a wheel, moving in rotation around an axis which is substantially perpendicular to a plane containing the first closed loop;

and/or wherein the wheel forming the second circular portion has a smaller diameter than the wheel forming the first circular portion (46), such that at least part of the second straight portion forms an angle with the first straight portion.

The invention also relates to a method for forming and filling containers using a machine as described above, the method comprising the following steps:

feeding successive preforms to successive holding means, such that each holding means holds a preform by its neck;

circulating the successive holding means holding the preforms in the forming area of the machine, the preforms being placed in successive molds and the molds being coupled to injection means for injecting a liquid inside the preforms placed in the molds to shape said preforms into containers in said forming area such that formed and filled containers are obtained at the end of said forming area;

retrieving formed and filled containers at an exit area of the machine;

wherein the formed and filled containers are circulated on the straight portion of the first closed loop defined by the machine before being retrieved from the machine at the exit area.

As mentioned previously, by circulating the formed and filled containers on the straight portion of the first closed loop, the liquid inside the containers is stabilized, thereby preventing the risks of spilling. Furthermore, the containers are not subjected to centrifugal forces of opposite signs, which limits the constraint applied by the liquid on the containers.

According to another feature of the method according to the invention, the formed and filled containers are held at least in the vicinity of their neck and at least in the vicinity of their bottom while they circulate on the straight portion.

By holding the filled and opened containers by their neck and bottom, while they are transported in the straight portion of the machine, the force applied by the liquid on the container does not imply a risk of deforming or destroying the containers even if the containers circulate at a high speed in the straight portion of the machine.

According to other features of the machine and of the method according to the invention:

the machine is adapted to shape from a preform and fill with liquid successive containers in forming stations, each forming station comprising a main station and an elementary station which are coupled together to form the forming station, wherein the machine comprises a series of elementary stations moving along a first closed loop and a series of main stations moving along a second closed loop, the first closed loop and the second closed loop comprising at least one common part wherein the main stations are coupled with the elementary stations and at least a distinct part wherein the main stations are separated from the elementary stations;

each elementary station comprises holding means for holding at least a neck of a preform or of a filled container;

the holding means comprise at least a neck holding part arranged to hold the container by its neck and at least a bottom holding part arranged to hold the container by its bottom, the neck holding part and the bottom holding part being movable relative to each other between a holding position, wherein a container is held and a release position wherein the bottom holding part and the neck holding part are moved away from each other;

each forming station comprises a molding cavity defining the shape of the container to be formed, each main station comprising at least a main part of said molding cavity;

wherein the forming station comprises a pair of side molding parts, each part of said pair being movable with respect to the other part between an opened configuration, wherein a preform can be inserted in said pair and a filled container is extractable from said pair, and a closed configuration wherein the pair of side molding parts cooperates with a bottom molding part to form the molding cavity; and wherein each main station further comprises injection means for injecting a liquid inside a preform placed in the molding cavity;

said elementary station comprises said pair of side molding parts, the holding means being constituted by said pair; and wherein the main part of the molding cavity included in the main station comprises said bottom molding part;

the main part of the molding cavity included in the main station comprises said pair of side molding parts and is arranged to receive said holding means;

the main station further comprises a transition arm arranged to move at least laterally said bottom molding part;

the main part of the molding cavity included in the main station comprises a main portion of said pair of side molding parts, the holding means comprising a complementary portion of said pair of side molding parts, the main portion and the complementary portion forming together said pair of side molding parts;

each elementary station further comprises an anti-spilling device for preventing liquid from overflowing out of a formed container;

the elementary station comprises an anti-spilling actuator arranged to place the anti-spilling device in an anti-spilling configuration and to move the anti-spilling device away from the holding means for retrieving the anti-spilling device from the neck of a preform;

the anti-spilling device comprises an extension device arranged to be placed on the neck of a preform or a container in a fluid tight manner, said extension device comprising a central bore extending in the continuity of the inner cylindrical opening of said neck;

the distinct part of the first closed loop comprises at least one straight portion extending downstream of the common part of the first closed loop and second closed loop, the common part of the first closed loop and second closed loop comprising at least one circular portion, the straight portion of the first closed loop extending immediately downstream of said circular portion and extending according to a direction forming a tangent of the circular portion at a separation junction between the circular portion and the straight portion, the main stations being separated from the elementary stations at said separation junction;

the machine comprises an exit area extending outside the first closed loop and connected to the first closed loop at an exit junction located downstream of the straight portion, and comprises an exit conveyor provided with exit carriers, and wherein the exit conveyor extends continuously along a retrieving area located upstream of said exit junction and along said exit area, each exit carrier comprising extraction means arranged to extract the filled container from the holding means while said exit carrier is in said retrieving area; and the machine further comprises reducing means located upstream the exit junction and arranged to reduce the pitch between successive elementary stations and/or further comprises reducing means located along said exit area and arranged to reduce the pitch between two successive exit carriers.

The invention also relates to a method for forming and filling containers using a machine according as described above, said method comprising the following steps:

loading successive preforms in the elementary stations in the distinct part of the first closed loop, moving the elementary stations holding preforms to the common part of the first closed loop and of the second closed loop, coupling the elementary stations to the main stations to form forming stations, performing the steps of forming and filling the containers in the forming stations in the common part of the first closed loop and of the second closed loop, decoupling the elementary stations from the main stations and moving the elementary stations to the distinct part of the first closed loop, said elementary stations holding the formed and filled preforms, and retrieving the formed and filled containers from the elementary stations in said distinct part of the first closed loop.

The invention also relates to a formed and filled container obtained by the method and using the machine described above.

The machine and method described above relate to a hydro forming process of containers. However, it should be noted that the invention can be applied to a simple filling process of already formed containers, by replacing the forming stations by filling stations, wherein the formed containers are placed in fluidic communication with the injection means.

BRIEF DESCRIPTION OF THE DRAWINGS

Other aspects and advantages of the invention will appear upon reading the following description, given by way of example and made in reference to the appended drawings, wherein.

DETAILED DESCRIPTION OF THE INVENTION

In the present description, the terms "upstream" and "downstream" are defined relative to the direction of circulation of the preforms and of the formed containers in the machine according to the invention.

In reference to FIGS. 1 to 4, there are described various embodiments of a machine for forming and filling containers 1 from preforms 2 using an incompressible liquid to shape and fill successive preforms 2 into containers 1. This method is known as hydro forming and will not be described in great detail herein.

Figure 5:
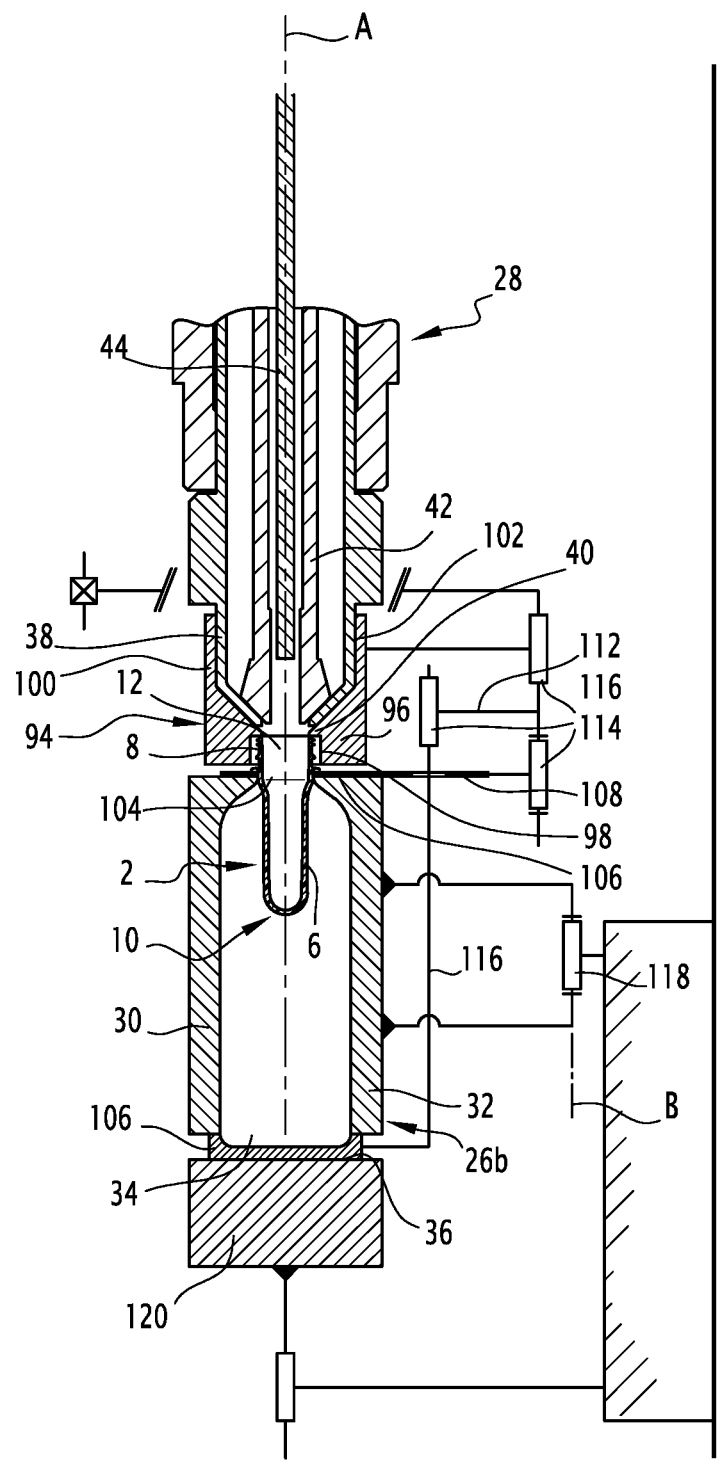
FIGS. 5 to 9 are cross-sectional views of part of the machine respectively according to lines V-V, VI-VI, VII-VII, VIII-VIII and IX-IX of FIG. 3.

Each preform 2, shown in greater detail in FIG. 5, is made of plastics material, for example of polyesters, such as polyethylene therephtalate (PET), polyethylene naphthalate (PEN), polyethylene imine (PEI), polytrimethylene terephthalate (PTT), polylactic acid (PLA), polyethylene furanoate (PEF), or polyolefins, such as polyethylene low density (LDPE) or high density (HDPE), polypropylene (PP), or styrene based materials such as polystyrene (PS), acrylonitrile butadiene styrene (ABS) or other polymers, such as polyvinyl chloride (PVC). Each preform 2 comprises a body 6 in the general shape of a tube of U-shaped longitudinal section, which is closed at one end and the other end of which already has the final shape of the neck 8 of the container 1. In FIG. 5, a preform 2 is shown, by way of non-limiting example, having a cylindrical body 6 extending along a substantially vertical axis A which coincides with the axis of the neck 8. The lower end 10, or bottom 10, of the body 6 is closed and has the general shape of a hemisphere, while the upper end of the preform 2 forms the neck 8, which defines an inner opening 12 and which is, in this case, provided with an outer radial collar adapted to receive a lid or a cap for example by screwing. The bottom 10 of the preform 2 is intended to be shaped to form the bottom 10 of the container 1, while the neck 8 remains the same from the preform 2 to the formed container 1. The preforms 2 are generally produced according to an injection molding process and may be molded at a site different from the site where the machine for forming containers 1 is located.

Figure 1:
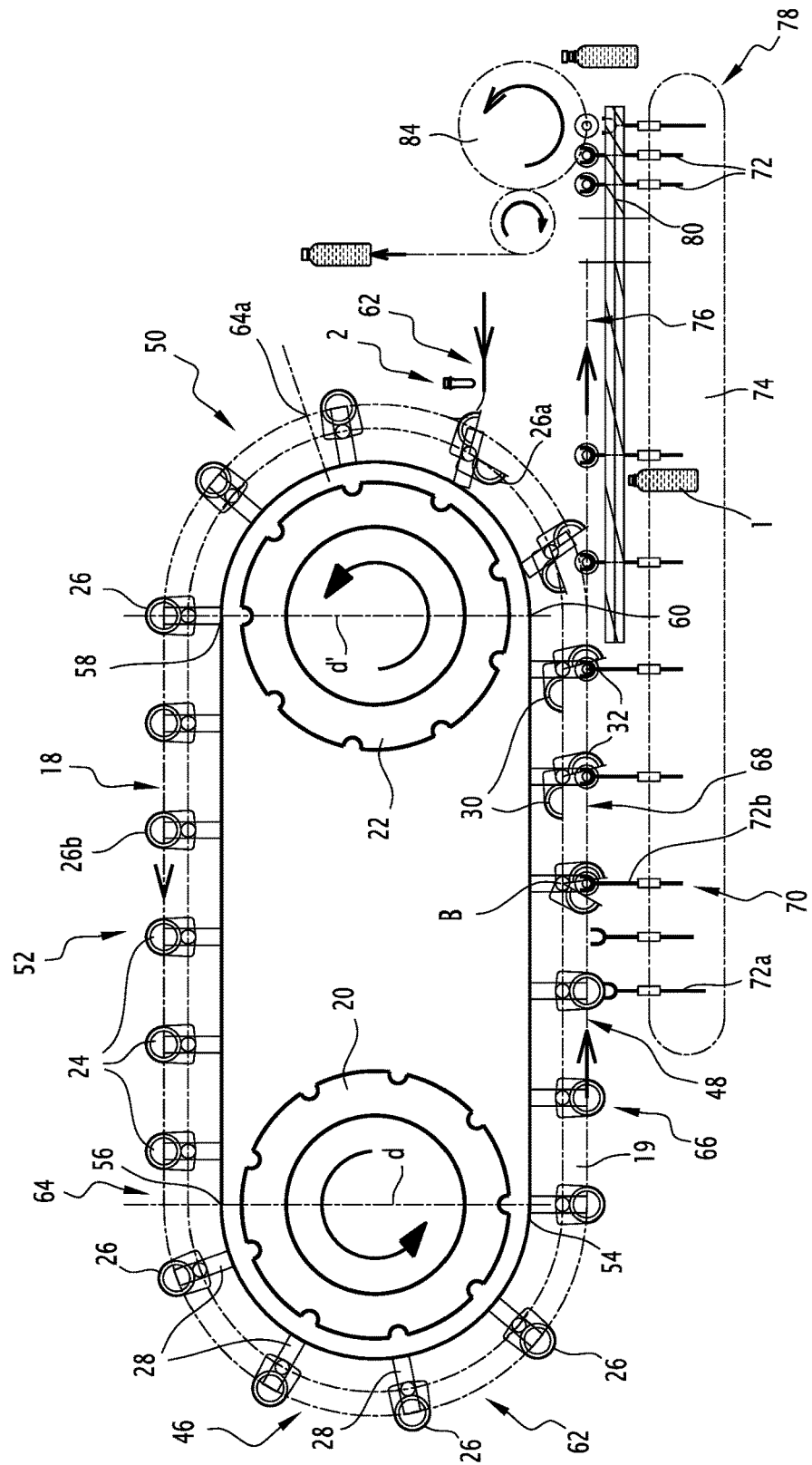
FIG. 1 is a diagrammatical view from above of a machine for forming containers according to a first embodiment of the invention.
Figure 2:
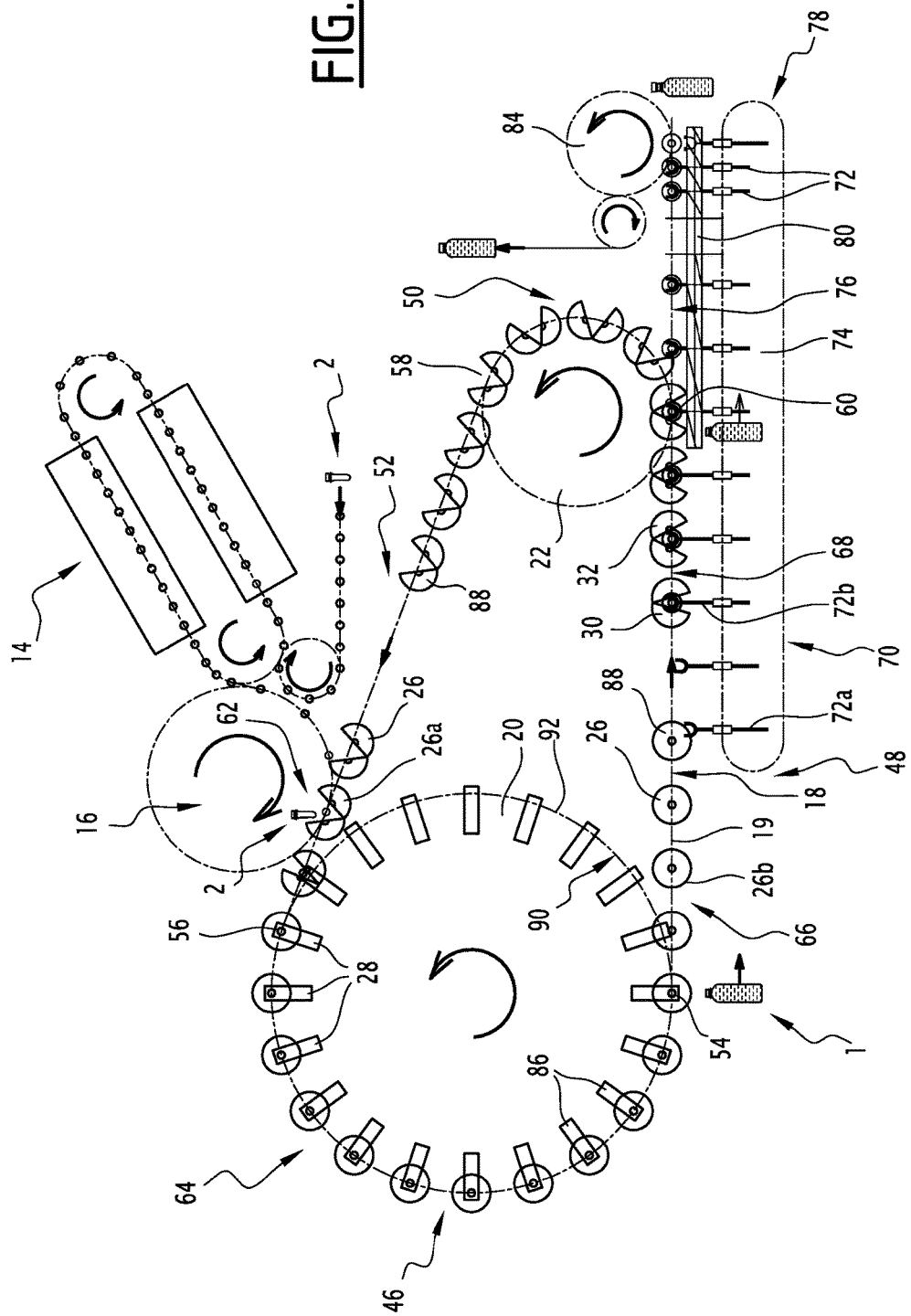
FIG. 2 is a diagrammatical view from above of a machine for forming containers according to a second embodiment of the invention.
Figure 3:
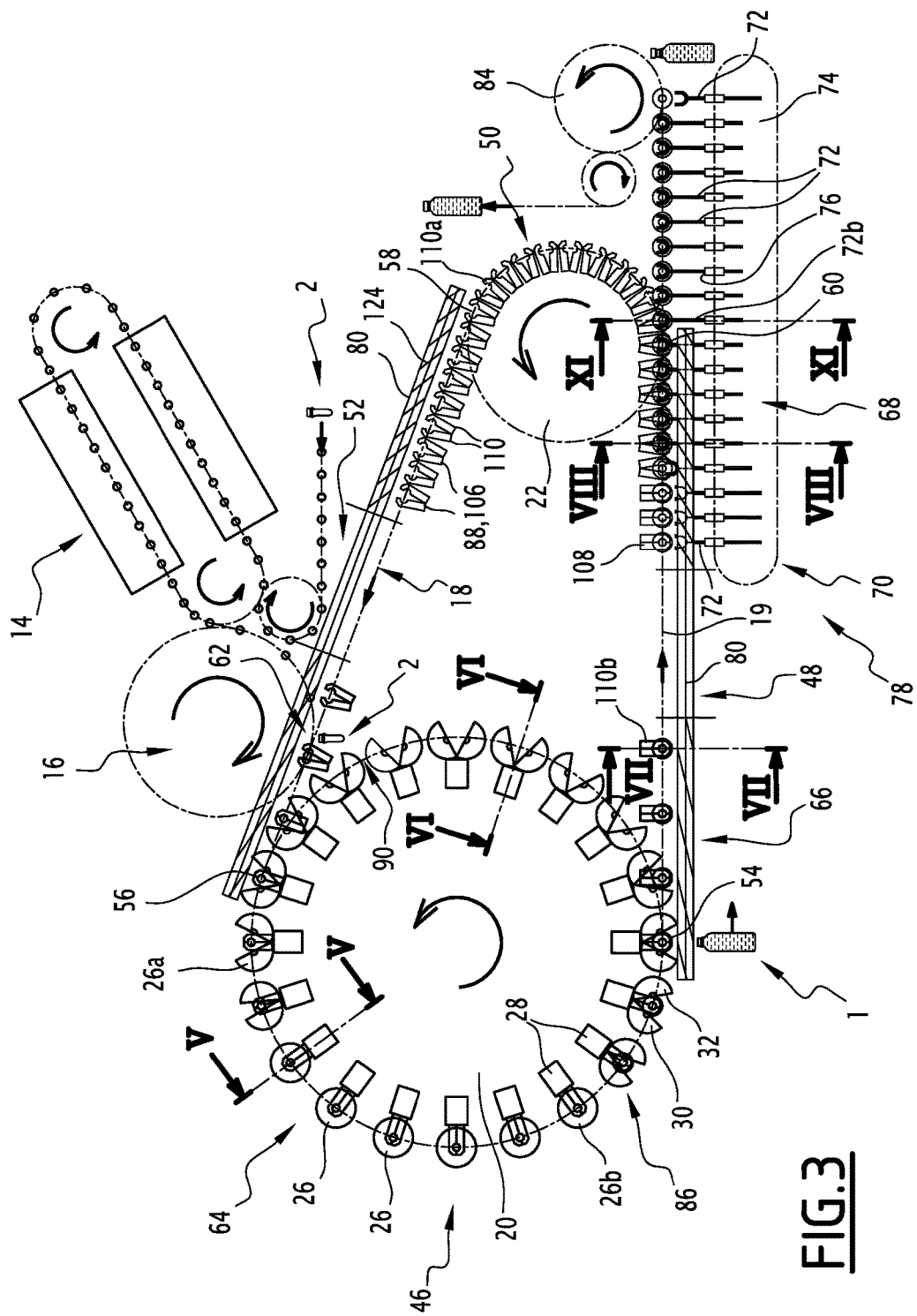
FIG. 3 is a diagrammatical view from above of a machine for forming containers according to a third embodiment of the invention.
Figure 4:
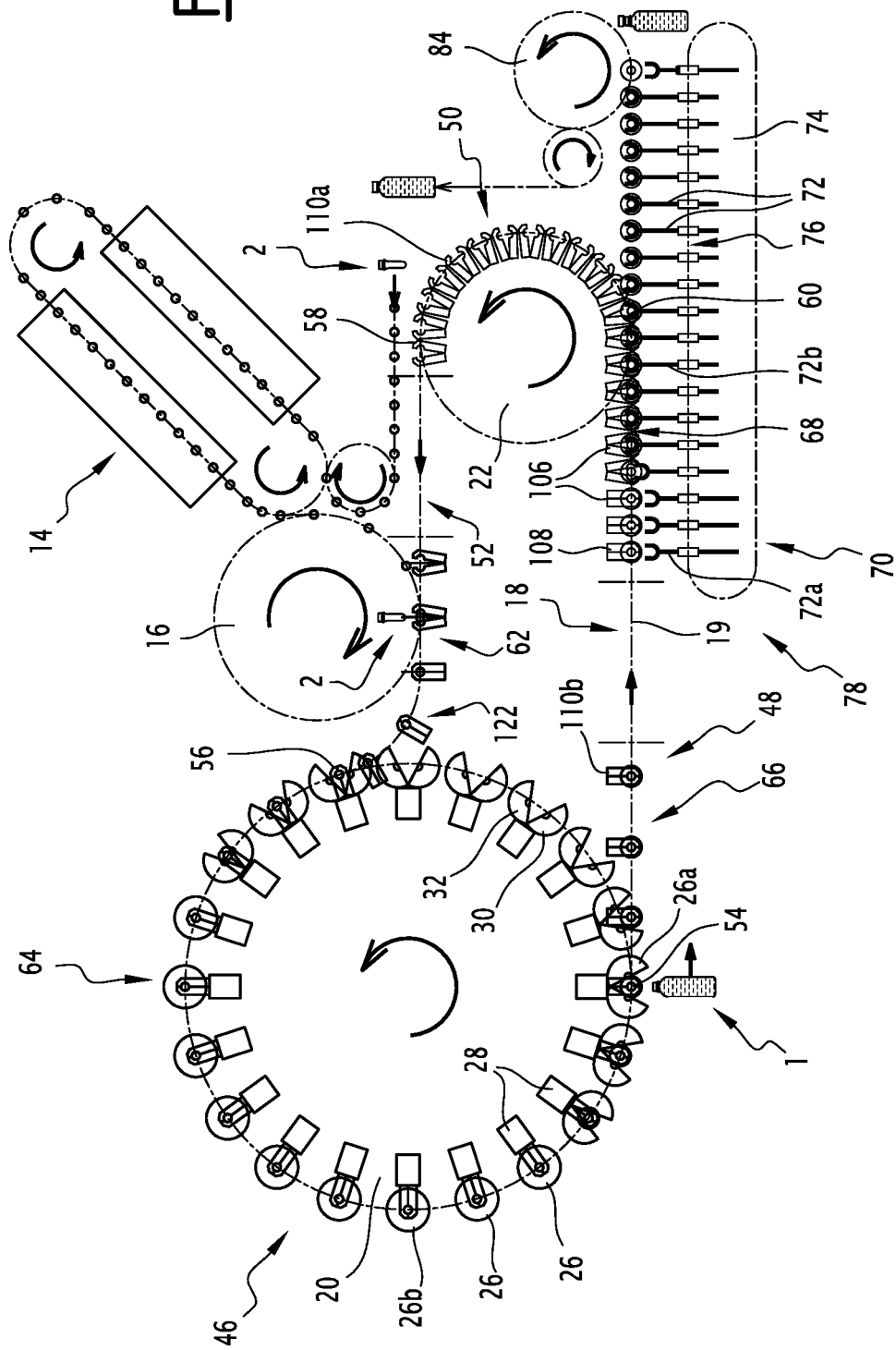
FIG. 4 is a diagrammatical view from above of a machine for forming containers according to a variant of the third embodiment of the invention.

Successive preforms 2 are introduced in the machine and undergo a step of heating in an oven 14, or heating station, as shown in FIGS. 2 to 4. It should be noted that in the first embodiment of the machine shown in FIG. 1, the oven has not been shown for clarity reasons, but the preforms 2 still undergo a heating treatment in the machine of FIG. 1. In a conventional manner, the preforms 2 are successively loaded on a carrier, forming a closed loop, circulating within the oven 14. During the passage of the preforms 2 within the oven, the preforms 2 are continuously heated up to a temperature compatible with their subsequent deformation into containers. Such an oven 14 and heating step are conventional in methods and machines for producing containers and will not be described in greater detail here.

At the outlet of the oven 14, the preforms are transferred downstream of the machine by a transfer wheel 16 (shown in FIGS. 2 to 4) to a first closed loop 18 defined by the machine.

The first closed loop 18 is formed by a conveyor 19, such as a chain comprising a plurality of links attached to each other to form an endless belt, adapted to carry the preforms 2 and to move them, or convey them, in a conveying direction according to a path forming the first closed loop 18 along which the preforms 2 are shaped into containers 1 as will now be described.

The conveyor 19 is moved along the path by a first wheel 20 and a second wheel 22 meshing with the chain on part of their periphery. The first wheel 20 and the second wheel 22, as well as the other various wheels, such as the transfer wheel 16 and the wheels moving the conveyor of the oven 14 are each movable in rotation according to an axis parallel to axis A of the preforms 2 when said preforms 2 are place in the machine. The axis of rotation of the wheels is furthermore substantially perpendicular to the plane(s) in which the first closed loop 18 extends.

The first embodiment of the machine will now be described in reference to FIG. 1.

In the first embodiment, the links of the chain forming the conveyor 19 are arranged the hold and convey along the first closed loop 18 a plurality of forming stations 24.

Each forming station 24 comprises a mold 26, injection means 28 and various actuation means (not shown) arranged to move and control the mold 26 and the injection means 28. The mold 26 and the injection means have been represented schematically in FIG. 1, but a more detailed embodiment of a mold 26 and of the injection means 28 are shown in FIG. 5.

Each mold 26 comprises at least two parts 30 and 32, movable relative to each other between an opened position as shown by reference 26a in the figures and a closed position as shown by reference 26b in the figures. A hinge extending along an axis B is for example provided between the two parts 30 and 32 to move said parts in rotation around axis B relative to each other between the opened and the closed positions.

In the opened position, the two parts of the mold 30 and 32 are spaced from each other such that a preform 2 can be introduced between the two parts 30 and 32 and such that a formed container 1 can be retrieved from the mold 26, as will be described subsequently.

In the closed position, the two parts of the mold 30 and 32 cooperate with each other in order to form a molding cavity 34 (FIG. 5) having the shape of the container 1 to be formed. According to the first embodiment, in the closed position, the two parts 30 and 32 of the mold 26 further form together a receiving surface forming a neck seat able to hold a preform 2 by its neck 8.

According to the embodiment shown in FIG. 5, a mold 26 can comprise more than two parts, and in particular it can further comprise a bottom part 36 arranged to define with the two parts 30 and 32 the molding cavity 34 in the closed position and being movable to be spaced from the two parts in the opened position. This embodiment of the mold and a variant will be described in more detail subsequently in reference to the third embodiment of the machine according to the invention.

The actuation means of a forming station 24 are arranged to move the mold 26 of the forming station 24 between the opened and closed position at particular places of the first closed loop 18.

The injection means 28 are equal or similar to conventional for a hydro forming process and comprise an injection nozzle 38 placed in fluidic communication with a liquid source (not shown). The injection nozzle 38 is movable between a retracted position (FIG. 6) and an active position (FIG. 5). The injection nozzle 38 comprises an outlet 40 through which the liquid from the liquid source is able to flow and the injection means comprise a sealing member 42, for example a seal pin or seal rod, movable to close and open the outlet. The injection means can further comprise a stretch rod 44 movable in the seal member 42 to assist in the axial deformation of the preform 2 as known per se. The functioning of such injection means 28 is conventional for a hydro forming process and will not be described in great detail herein.

In the active position, the injection nozzle 38 of a forming station 24 is placed on the neck 8 of the preform 2 placed in the mold 26 of said forming station 24 such that liquid can be injected inside the preform 2 through the outlet 40 when the sealing member 42 is in the opened position. In the retracted position, the injection nozzle 38 is retracted to allow the placement of a preform and the extraction of a container below said injection nozzle 38.

The actuation means of a forming station 34 are arranged to move the injection nozzle 38 between the retracted and active positions, as well as to move the sealing member 40 and the stretch rod 44 at particular places of the first closed loop 18 to perform the steps of forming a container 1 from a preform 2.

The first wheel 20 and the second wheel 22 of the machine shown in FIG. 1 have the same diameter such that the first closed loop 18 has an oblong shape.

More particularly, the first closed loop 18 comprises, in the upstream-downstream order:
a first circular portion 46;
a first straight portion 48;
a second circular portion 50; and
a second straight portion 52.

The first circular portion 46 is formed by the part of the conveyor 19 passing around an outer part of the periphery of the first wheel 20. By outer part, it is meant the part of the first wheel 20 which does not face the second wheel 22.

The first straight portion 48 is formed by the part of the conveyor 19 extending between the first circular portion 46 and the second circular portion 50. The first straight portion 48 extends substantially rectilinearly between the first circular portion 48 and the second circular portion 50. By "substantially rectilinearly", it is meant that the radius of curvature of the first straight portion is greater than 5 meters. According to the embodiment shown in FIG. 1, the first straight portion 48 extends in a direction forming a tangent of the first circular portion 46 at the junction 54 between the first circular portion 46 and the first straight portion 48, meaning that the first straight portion 48 forms a tangent to the first circular portion 46 at the junction 54 between said portions. This embodiment is particularly advantageous as will be described subsequently but, according to other embodiments, the first straight portion 48 can extend in another direction.

The second circular portion 50 is formed by the part of the conveyor 19 passing around an outer part of the periphery of the second wheel 22. By outer part, it is meant the part of the second wheel 22 which does not face the second wheel 20.

The second straight portion 52 is formed by the part of the conveyor 19 extending between the second circular portion 50 and the first circular portion 46. According to the embodiment shown in FIG. 1, since the first wheel 20 and the second wheel 22 have the same diameter, the second straight portion 52 is substantially parallel to the first straight portion. The junction 56 between the second straight portion 52 and the first circular portion 46 is diametrically opposed to the junction 54 between the first straight portion 48 and the first circular portion 46, with respect to the first wheel 20, as shown by dotted line d of FIG. 1. The junction 58 between the second straight portion 52 and the second circular portion 50 is diametrically opposed to an exit junction 60 between the first straight portion 48 and the second circular portion 50, with respect to the second wheel 22, as shown by dotted line d' of FIG. 1.

As mentioned previously, successive forming stations 24 are distributed along the first closed loop 18 described previously. According to the embodiment shown in FIG. 1, twenty forming stations 24 are provided on the conveyor 19. Variants may contain a greater or a smaller number of forming stations 24.

The machine comprises a loading area 62, wherein the successive preforms 2 are loaded into successive molds 26 of the successive stations 24, meaning that in the loading area 62, each preform 2 is transferred from the transfer wheel 16 to the mold 26 of a forming station 24. Consequently, the actuation means of the forming stations 24 are arranged such that, for a given forming station 24, the mold 26 is in the opened position and the injection means 28 are in the retracted position when the given forming station 24 is in the loading area 62. According to the embodiment shown in FIG. 1, the loading area 62 is located in the second circular portion 50, for example in the vicinity of the middle of the second circular portion 50.

Once, a preform 2 has been loaded in the mold 26 of a forming station 24 located in the loading area 62, the actuation means of the forming station 24 are arranged to move the mold 26 in the closed position, such that the preform 2 extends in the molding cavity 34 defined by the mold 26. When the preform 2 extends in the molding cavity 34, the preform 2 is held by its neck 8 by the mold 26, which therefore forms holding means of the preform, said neck 8 extending outside the molding cavity 34 and closing said molding cavity 34 in a fluid tight manner, as shown in FIG. 5. Once the mold 26 is placed in the closed position, said position is locked for example by appropriate locking means arranged to prevent the mold 26 from moving to the opened position.

The forming station 24 then moves downstream of the loading area 62 and the actuation means of the forming station 24 are arranged to move the injection nozzle 38 of the injection means 28 in the active position.

The forming station 24 is then located at a beginning 64*a* of a forming area 64 of the machine, wherein the steps for forming the container 1 from the preform 2 are carried out.

According to the embodiment shown in FIG. 1, the forming area 64 comprises a part of the second circular portion 60, downstream of the loading portion 62, the second straight portion 52 and the first circular portion 46, up to the junction 54 between the first circular portion 46 and the first straight portion 48.

When a forming station 24 circulates in the forming area 64, the steps of shaping the preform 2 into a filled container 1 are successively performed. This means that at the beginning 64*a* of the forming area 64, the injection nozzle 38 of the injection means 28 is placed in the active position. Then, the sealing member 42 is moved to open the outlet 40 to place the inner volume of the preform in fluidic communication with the liquid source and to inject the liquid in the preform 2. During these steps, the stretch rod 44 is actuated in order to assist in the axial deformation of the preform 2 as known per se. The injection of liquid into the preform 2 causes said preform 2 to expand and to adopt the shape of the molding cavity 34 as known per se. Consequently, at the end of the forming area 64, a formed and filled container 1 is located inside the mold 26. Once the forming and filling of the container 1 is completed, the seal member 42 is placed in the closed position to stop the injection of liquid. At this stage, the forming station 24 having the mold 26 containing the formed and filled container 1 is located at the end of the first circular portion 46, for example in the vicinity of, or at, the junction 54 between the first circular portion 46 and the first straight portion 48. By in the vicinity of, it is meant that the forming station 24 can be located slightly upstream or slightly downstream of the junction 54.

At the end of the forming area 64, the filled and formed container 1 is completely held by the mold 26, and more particularly by its neck 8 and by its bottom 10, which allows moving the filled container 1 at high speed without risking a deformation or a breakage of the container 1.

At the end of the forming area 64, the forming station 24 enters the first straight portion 48 and is carried along said first straight portion 48 to the junction 60 between the first straight portion 48 and the second circular portion 50. This means that the first straight portion 48 extends at least in part downstream of the forming area 64. By "at least in part", it is meant that an upstream end part of the first straight portion 48 can be used to finish the forming process in the forming area 64 and that the rest of the first straight portion 48 extends downstream of the forming area 64.

According to the embodiment shown in FIG. 1, since the first straight portion 48 is tangential to the first circular portion 46, the transition between these portions 46 and 48 limits the acceleration imparted on the formed and filled containers 1 and prevents a brutal change in the centrifugal force imparted on the containers 1, thereby limiting the constraints applied on the containers 1 and limiting the risks of spilling or of breakage of the containers 1.

The part of the first straight portion 48 adjacent to the first circular portion 46 forms a stabilization area 66, during which the liquid inside the container 1 is allowed to settle inside the container 1 after the rapid movement of rotation to which said liquid was subjected during the circulation of the forming station 24 in the first circular portion 48. The injection nozzle 38 remains in its active position during the circulation of the forming station 24 in the stabilization area 66 such that the liquid cannot be spilled outside the container 1 while it is settling inside the container 1. Consequently, the stabilization area 66 allows preventing the risks of spilling once the container 1 is filled with liquid. The length of the stabilization area 66 is arranged so that, at the end of said stabilization area 66, the liquid filling the container 1 is completely settled inside the container 1 such that the moving of the filled container 1 at high speed does not impart a force on the liquid sufficient for the liquid to be spilled over the container 1 once the injection nozzle 38 is moved in its retracted position. For example, the stabilization area has a length substantially comprised between 1 m and 2 m for first and second wheels 20 and 22 having a diameter substantially comprised between 1.2 m and 3 m and a first straight portion having an overall length, between the junction 54 and the exit junction 60, substantially comprised between 2 m and 4.5 m.

At the end of the stabilization area 66, the injection nozzle 38 is moved in the retracted position and the forming station enters a retrieving area 68, wherein the container 1 is retrieved from its mold 26.

In the retrieving area 68, after the injection nozzle 38 has been moved in the retracted position, the actuation means of the forming station 24 are arranged to move the mold 26 in the opened position such that the container 1 can be retrieved from the mold 26. The opening of the mold 26 is synchronized with retrieving means 70 arranged to seize the container 1 and hold it until the mold 26 and the container 1 are separated.

Figure 8:
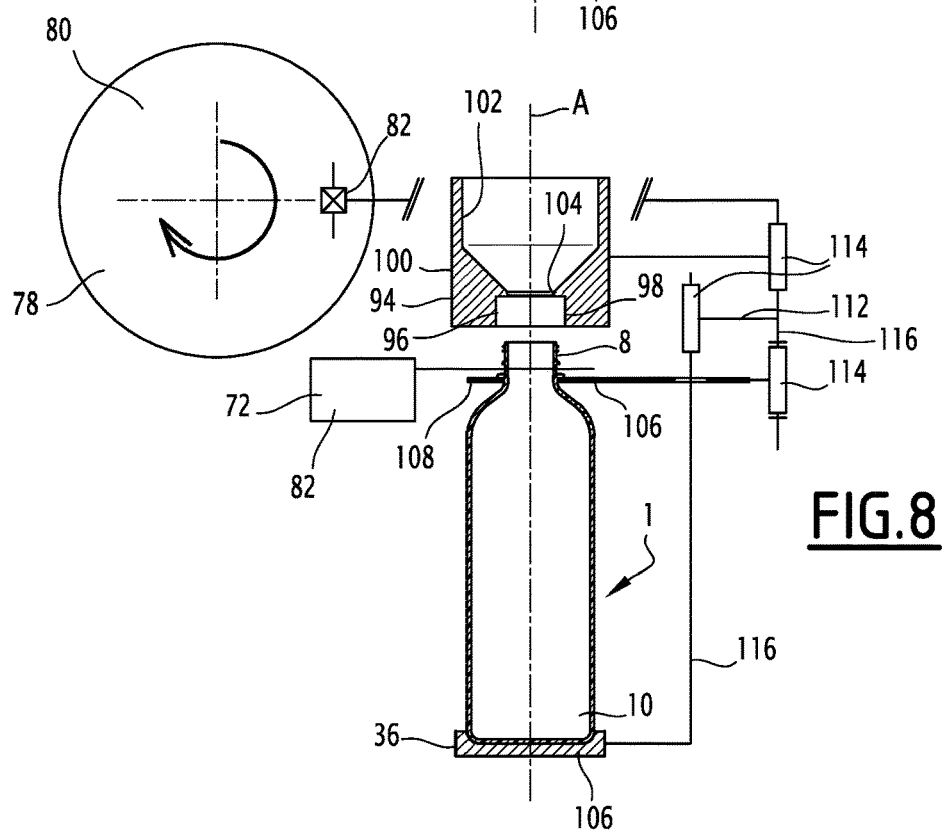
Figure 9:
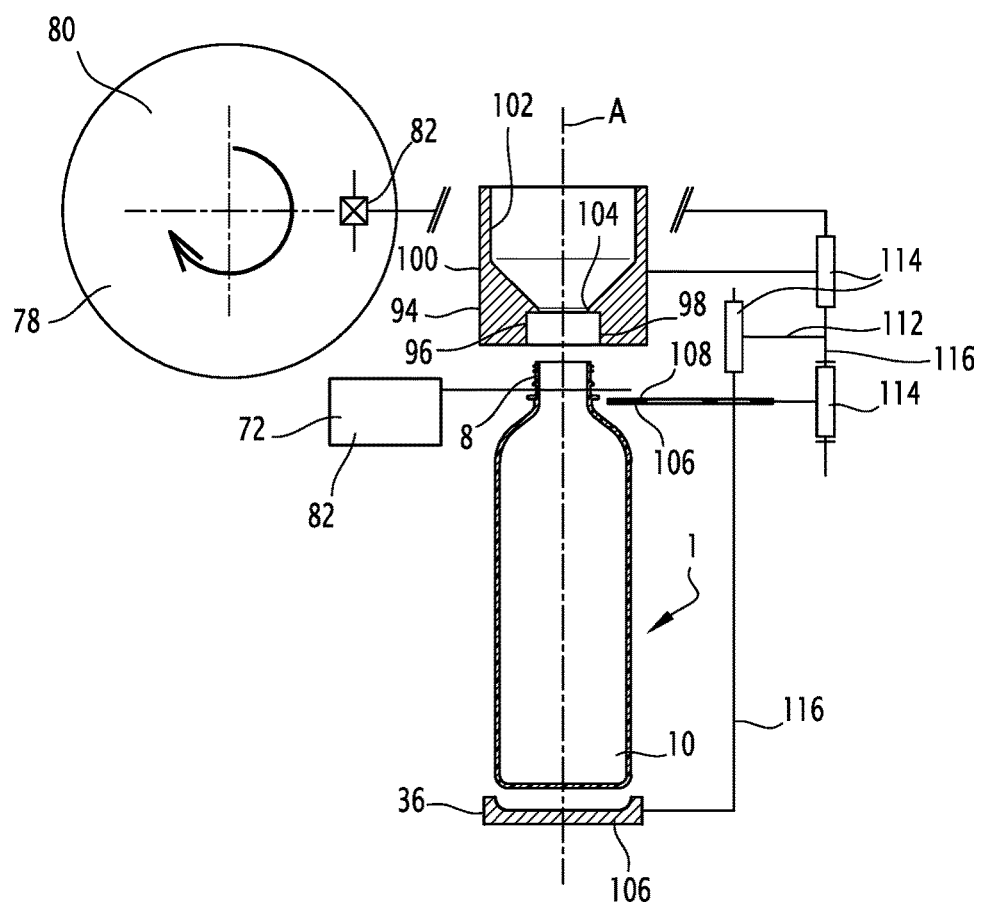

The retrieving means 70 comprise for example a plurality of extraction forks 72, each arranged to hold a container by the shoulder formed under the neck 8 of a container, as more clearly visible in FIGS. 8 and 9. The extraction forks 72 are carried by a conveyor 74 parallel to the first straight portion 48 and the retrieving means 70 comprise suitable actuation means arranged to move each extraction fork 72 from a retracted position (reference 72*a* in FIGS. 1 to 4), wherein the extraction fork extends away from the straight portion, and an active position (reference 72*b* in FIGS. 1 to 4), wherein the extraction fork extends in the first straight portion 48 in order to seize a container 1 by its neck. As mentioned previously, the retrieving means 70 are synchronized with the actuation means of the forming stations such that when a mold 26 is moved to its opened position, an extraction fork 72 is placed in its active position and seize the container 1 placed inside said mold 26 such that when the container is no longer retrained by the mold said container is held by the extraction fork 72, thereby ensuring that a container is always held in the machine, even when the container 1 is separated from the mold 26.

The mold 26 continues its movement towards the opened position while the container 1 is held by the extraction fork 72 and the forming station 24 is moved on the first straight portion 48 until it reaches the junction 60 between the first straight portion 48 and the second circular portion 50.

At the exit junction 60, the forming station 24 moves along the second circular portion 50 while the filled and formed container 1 held by the extraction fork 72 exits the first closed loop 18 and travels along an exit area 76, which extends in the continuity of the first straight portion 48 downstream of the exit junction 60 between the first straight portion 48 and the second circular portion 50. Advantageously, the exit area 76 includes a substantially rectilinear portion which is in straight alignment and in continuity with the first straight portion 48 of the first closed loop 18. Consequently, the exit junction 60, which extends immediately downstream of the first straight portion 48, forms a separation point where the forming station 24 follows the path defined by the first closed loop while the formed and filled container follows a different path defined by the exit area 76. The container 1 is therefore completely extracted from the mold at the end of the retrieving area 68 formed by the downstream end of the first straight portion 48.

At the exit junction 60, the opened position of the mold 26, the orientation of the forming station 24 and the exit area 76 are arranged such that the movement of the formed and filled container 1 on the exit area 76 is not impaired by any part of the mold 26, meaning that the container 1 and the mold 26 can move along different paths without interfering.

The forming station 24, still with its mold 26 in opened position, moves toward the loading area 62 where a new preform 2 can be loaded inside the mold 26 and the above described forming process can be repeated.

The formed and filled container 1 held by an extraction fork moves in the exit area 76, where a reduction of the pitch between successive containers 1 is performed by reducing means 78. The reducing means 78 for example comprise a worm gear 80 with which a roller 82 provided on an extraction fork 72 is able to mesh, the worm gear 80 being arranged to progressively reduce the distance between successive extraction forks 72 holding containers 1, as shown in the exit area 76 of FIG. 1 and as shown diagrammatically in FIGS. 7 to 9. Alternatively, the reducing means 78 can be formed by successive carriers carrying the extraction forks 72, said carriers being controlled such that the distance between successive carriers is reduced in the exit area 76.

At the end of the exit area 76, the formed and filled containers 1 are picked up by a capping wheel 84, where a cap is applied on each container 1 in a manner known per se. The pitch reduction between the formed and filled containers 1 allows using a capping wheel 84 having a smaller diameter, which does not impart an important centrifugal force on the containers 1.

It should be noted that the pitch reduction occurs while the containers are on a substantially rectilinear path in the exit area 76. Consequently, the deceleration to which the containers are subjected during the pitch reduction is controlled and progressive and does not apply a centrifugal force on the containers 1, which allows a pitch reduction without spilling the liquid in the containers 1 even if the containers 1 are not yet closed by a cap, which would not be the case with a pitch reduction occurring in a wheel.

Downstream of the capping wheel 84, the closed containers are retrieved from the machine as known per se.

The first embodiment of the machine disclosed above allows having a large number of active forming stations 24 at the same time. By active forming stations, it is meant forming stations that are performing one of the steps of forming and filling a container from a preform. Indeed, since the forming stations 24 are distributed all over the first closed loop, the active forming stations can be distributed on a large part of the first closed loop. For example, for a machine comprising twenty four forming stations 24, as shown in FIG. 1, twenty forming stations 24 can be active at the same time. Consequently, the machine according to the embodiment of FIG. 1 has a large throughput. Furthermore, since the forming station 24 are moved along the first straight portion 48, the injection nozzle 38 can be placed in the retracted position at the last needed moment, only once the liquid has had time to settle inside the filled containers in the stabilization area 66, thereby greatly reducing the risks of spilling. According to this first embodiment, the holding means for holding the preforms 2 and the formed and filled containers, which are formed by the molds 26, are integrated in the forming stations 24 over the whole first closed loop 18, meaning that the holding means are never separated from the forming stations 24 and that there is no need to foresee a particular and potentially complex cinematic to couple and decouple the holding means from the forming stations 24.

However, according to this first embodiment, the forming stations 24, which are very heavy assemblies, need to be carried by the conveyor 19, which therefore has to be very robust and which can cause mechanical problems when constructing the machine. Furthermore, other difficulties come from the fact that the forming stations need to be connected to a liquid source, while being able to move all along the first closed loop 18, which can cause other mechanical problems.

Other embodiments of the machine overcoming these problems will now be described. In these embodiments, the forming stations 24 are formed by the cooperation of main stations 86 and of elementary stations 88, the elementary stations 88 moving along the first closed loop 18, while the main stations 86 move along a second closed loop 90, as will now be described.

In the second embodiment of the machine, shown in FIG. 2, the main stations 86 are each formed by the injection means 28, described above, while the elementary stations 88 are each formed by the molds 26, which form the holding means of the preform and of the formed and filled containers, as in the first embodiment.

The first loop 18 is as described according to the first embodiment, meaning that it also comprises a first circular portion 46, a first straight portion 48, a second circular portion 50 and a second straight portion 52.

However, in the second embodiment, since only the molds 26 are transported along the entire first closed loop, instead of the entire forming stations 24, and since the molds 26 are much less cumbersome than the forming stations 24, the second wheel 22 can have a reduced diameter relative to the first embodiment, meaning that the second wheel 22 has a diameter inferior to the diameter of the first wheel 20, thereby reducing the space requirement for the machine. The diameter of the second wheel 22 is for example comprised between 1 m and 1.5 m, while the first wheel 20 has the same diameter as in the first embodiment.

Consequently, the second straight portion 52 is not parallel to the first straight portion and forms an angle, for example substantially comprised between 20° and 45°, with the first straight portion 48. As will be described later, this angle, in addition to reducing the space requirement for the machine, allows increasing the number of active forming stations 24.

The molds 26 and their actuation means are carried by the conveyor 19. The actuation means carried with the molds 26 include the means for moving the molds between their opened and closed positions and the means for locking the molds in the closed position. Since the molds 26 are far less heavy than the entire forming stations 24, the links of the chain forming the conveyor 19 do not need to be as robust as in the first embodiment and the machine is subjected to less mechanical constraints, which increases the lifetime of its various parts.

The second closed loop 90 is defined by the periphery of the first wheel 20, meaning that the second closed loop 90 has a circular shape defined by the circle formed by the periphery of the first wheel 20. The first wheel 20 therefore carries the injection means 28 of the forming stations and their actuation means, which greatly simplifies the mechanical structure of the machine, since the injection means 28 can be moved as "one block" with the first wheel 20 and do not have to mesh with the links of the conveyor 19. Furthermore, the liquid source can be much more easily connected to the injection means 28, which simply move in rotation around a single axis, instead of moving in rotation around two axes and in translation along two other axes, as in the first embodiment.

Since the second closed loop 90 is formed by the periphery of the first wheel 20, the first closed loop 18 and the second closed loop 90 have the first circular portion 46 in common, meaning that the first circular portion 46 is part of the first closed loop 18 as well as part of the second closed loop 90.

The movement of the wheels 20 and 22 is arranged such that, when a mold 26 enters the first circular portion 46, it cooperates with a main station 86, i.e. with injection means 28, in order to form a forming station 24 able to perform the steps of forming and filling a container 1 from a preform 2. Consequently, appropriate connection means are provided on the main stations 86, said connection means being able to receive a mold 26 and to place said mold 26 in proper register with the injection means 28. The connection means are further adapted to separate the mold from the main station 86 at the end of the first circular portion 46 such that the mold 26 can move along the first straight portion 48 while the main station 86 remains on the first wheel 20 and move along the inner part 92 of the periphery of the wheel 20 to return to the beginning 56 of the first circular portion 46. By the inner part of the periphery, it is meant the part of the periphery which faces the second wheel 22. The inner part 92 forms a distinct part of the second closed loop 90, while the first straight portion 48, the second circulate portion 50 and the second straight portion 52 form a distinct part of the first closed loop 18. By distinct part, it is meant a part of the loop that belongs only to said loop and not to the other loop. This means that the distinct part of the first closed loop 18 extends outside the periphery of the first wheel 20 and is not formed by the periphery of said wheel 20. In other words, the elementary stations 88 are detached from the first wheel 20 when said elementary stations 88 circulate in the distinct part of the first closed loop 18.

According to another particular feature of the machine according to the second embodiment, the machine comprises means for placing an extension device 94 on the neck 8 of each preform 2. An example of an extension device 94 is shown in FIGS. 5 and 7 to 9.

The extension device 94 is arranged to increases the height of the neck 8 of the container, thereby offering an extra space for the liquid contained in the formed containers, which reduces the risks of spilling the content of the containers when the containers are moved with the molds 26 on the first straight portion 48 after the molds have been separated from the main stations 86 and the injection nozzles 38 are no longer closing the containers 1.

Each extension device 94 comprises a connection part 96 adapted to be attached to the neck 8 of a preform. To that end, the connection part 96 comprises a central bore defined by a wall 98 having a shape arranged to enclose the outer face of the neck 8. Consequently, the diameter of the central bore is greater to the diameter of the neck 8. According to a particular embodiment, the wall 98 can have a shape substantially complementary to the shape of the outer face of the neck and a diameter substantially equal to the diameter of the neck 8. Advantageously, the extension device 94 may be able to protect the neck 8 against deformation during the injection of the forming liquid at high pressure and during the filling of the container. When the extension device 94 is attached to or placed on the neck 8, the central bore of the connection part 96 and the inner opening 12 of the neck 8 are substantially coaxial and extend along axis A.

The extension device 94 further comprises an extension part 100 extending in the continuity of the connection part 96 and comprising a central bore, defined by a wall 102, coaxial with the central bore of the connection part 96. According to the embodiment shown in FIGS. 5 and 7 to 9, the diameter of the central bore of the extension part 100 is greater than the diameter of the central bore of the connection part 96 in order to receive the injection nozzle 38, as will be described later. The inner face of the wall 102, surrounding the central bore, is for example substantially smooth and can be tapered such that the central bore of the extension part 100 has a conical shape in the vicinity of the connection part 96. When the extension device 94 is attached to or placed on the preform 2, the extension part 100 extends over the connection part 96 substantially in the continuity of the neck 8 in order to extend the length of the neck 8. The length of the extension part 100 along the axis of its central bore, i.e. according to axis A when the extension device 94 is attached to or placed on the preform 2, is larger than the diameter of the inner opening 12 of the neck 8, and is for example comprised between 2 times and 10 times the diameter of the inner cylindrical opening 12 of the neck 8. The length of the extension part 100 is for example comprised between 10 and 100 mm, while the neck of the preform 2 is typically comprised between 5 and 15 mm. The length of the extension device 94 is chosen relative to the different speeds of the machine. The greater the speeds of the machine are, the longer the extension device 94 has to be.

When the extension device 94 is attached to or placed on the neck 8 of the preform 2, the inner opening 12 of the neck 8 remains accessible via the central bores of the extension part 100 and of the connection part 96 of the extension device 94.

A shoulder 104 extends radially in the central bore of the extension device 94 between the connection part 96 and the extension part 100. The inner diameter of the shoulder 104 is arranged such that, when the connection part 96 is attached to or placed on the neck 8, the shoulder 104 rests on the upper end of the neck 8 and forms an abutment stopping the extension device 94 when it is being attached to the preform 2, thereby preventing the extension part 100 of the extension device 94 of reaching the neck 8. Furthermore, the shoulder 104 forms a seal between the inner volume of the extension part 100 and the space between the outer face of the neck 8 and the wall 98 of the connection part 96, thereby preventing any liquid from flowing in this space, when the liquid is in the inner volume of the extension part 100, which means that the extension device 94 is placed on the preform 2 in a fluid tight manner.

The extension device 94 is for example made of plastics material and the inner wall 102 of the extension part 100 can for example be coated with a hydrophobic material or can be made of an hydrophobic material in order to ensure that any liquid present in the central bore of the extension art 100 will flow from said central bore towards the inner opening 12 of the neck 8.

The extension devices 94 are attached to or placed on successive preforms 2 upstream of the loading area 62 of the first closed loop 18 such that the preforms are placed in the molds 26 with an extension device already attached to them. Alternatively, the extension devices 94 could be attached to or placed on the preforms downstream of the loading area 62 when the preforms are already held in molds 26. The extension devices 94 can be attached to or placed on the successive preforms upstream or downstream of the oven 14. When the extension devices 94 are attached to or placed on the preforms upstream of the oven 14, the extension devices 94 protects the neck 8 of the preforms 2 during the heating step. When the extension devices 94 are attached to or placed on the preforms downstream of the oven 14, the extension devices 94 are maintained at a constant temperature, which prolongs their duration in time.

According to a particular embodiment, the extension devices 94 are each attached to a mold 26 and are movable relative to said mold 26 along axis A such that the extension device is spaced from the mold 26 when said mold is in the opened position, so that a preform can be inserted in the mold, and such that the extension device is placed on the neck of the preform 2 when the mold 26 is closed. Such an embodiment is particularly advantageous in that the extension device 94 can be guided on the preform 2 relative to the mold 26 to properly align the axis of the central bore of the extension device 64 with the axis A of the preform 2.

According to the embodiment shown in FIG. 2, the loading area 62 of the machine is formed in the second straight portion 52 of the first closed loop 18, just before the molds 26 reach the first circular portion 46 of the first closed loop 18. However, it is to be understood that the loading area 62 could be placed more upstream, for example in the second circular portion 50 of the first closed loop, as in the first embodiment.

The functioning of the machine according to the second embodiment is substantially the same as in the first embodiment except for the coupling and decoupling of the molds 26 and of the injection means 28 for forming the forming stations 24.

The preforms 2 are placed in the molds 26 in the opened position in the loading area 62 and the molds 26 are moved to the first circular portion 46, the molds 26 being closed when they reach the junction 56 between the second straight portion 52 and the first circular portion 46. At said junction 56, each mold 26 is coupled with a main station 86, i.e. with injection means 28, to form a forming station 24. When the mold 26 is coupled to injection means 28, the holding means of the preform, formed by the whole mold 26, is therefore integrated in the forming station 24. According to the embodiment shown in FIG. 2, the mold 26 is then closed at the beginning of the first circular portion 48, but the mold 26 could be closed before the junction 56.

The forming and filling steps of the containers 1 from the preforms 2 are then performed while the active forming stations 24 are moved along the first circular portion 46. The forming and filling steps have already been described in relation with the first embodiment and will not be described again herein. It should however be noted that the extension device 94 can help in the correct positioning of the injection nozzle 38 relative to the preform 2 since the extension device 94 can receive the injection nozzle 38 as shown in FIG. 5. Furthermore, as described previously, the extension device 94 is able to protect the neck 8 against deformation during the injection of the forming fluid at high pressure and during the filling of the container.

At the junction 54 between the first circular portion 46 and the first straight portion 48, the molds 26 are decoupled from the main stations 86 and are moved along the first straight portion 48 while the main stations 86 return towards the junction 56 between the second straight portion 52 and the first circular portion 46 as described previously.

It should be noted that the forming area 64 of the machine according to the second embodiment is reduced relative to the first embodiment, since said forming area 64 is limited to the first circular portion 46 of the first closed loop 18, meaning that the first straight portion extends downstream of the forming area 64. For example, for a first wheel carrying twenty main stations 86, nine active forming stations 24 can be formed. It should be noted that by forming an angle between the first straight portion 48 and the second straight portion 52, it is possible to increase the number of active forming stations 24 since in this case, the junction 56 between the second straight portion 52 and the first circular portion 46 is placed "earlier", i.e. more upstream on the first wheel 20, than in the case where the first and second straight portions are parallel to each other, meaning that the forming station can become active more upstream on the first wheel 20.

Prior to reaching the junction 54 between the first circular portion 46 and the first straight portion 48, the injection nozzle 38 has to be placed in the retracted position in order to allow the mold to be decoupled from the main station 86 at said junction 54. This means that when the mold 26 reaches the junction 54 and moves to the first straight portion 48, the container 1 is not closed by the injection nozzle 38 although a centrifugal force is applied on the liquid in the container. The extension device 94, by extending the length of the neck 8, prevents the liquid from being spilled outside the container 1 when said container 1 is not closed.

More particularly, when the containers 1 are moved in rotation at high speed, the centrifugal force tends to displace the liquid outside the container 1. Thanks to the extension device, the liquid in maintained in the extension part 100 of the extension device 94. Therefore, the liquid is not spilled outside the container 1 even when said container is subjected to high speeds and important centrifugal forces. Consequently, the rotation speeds and transfer speeds of the machine can be increased for improving the throughput of the machine.

When the mold 26 moves along the stabilization area 66 and holds a formed and filled container 1, the liquid inside the extension part 100 of the extension device 94 has time to return inside the container 1 since the liquid is no longer subjected to a centrifugal force on the first straight portion 48. The particular conical shape of the inner wall 102 of the extension part 100 guaranties that the liquid will flow inside the container 1 and will not remain trapped in the extension device 94. A coating of hydrophobic material can also help to guaranty the return of the liquid inside the container 1.

It should be noted that the extension device 94 described above is only an example of means for preventing liquid from overflowing out of a formed container 1 that can be implemented to overcome the problem of the liquid subjected to a centrifugal force. Such means could also be formed for example by means for temporarily closing the inner volume of the container 1 once said volume has been filled by liquid and before a final cap is fitted on the container. For example, the elementary station may be provided with a spilling protection comprising a temporary blocking plate that is introduced between the neck end and the injection means 28, and blocks the liquid inside the filled container before the withdrawal of the injection means 28. That blocking plate is intended to be withdrawn when the liquid is stabilized inside the container 1, and at least before the cap fitting.

Once the mold 26 reaches the retrieving area 68, the mold 26 is opened and the container 1 is retrieved from the mold 26 as already described in relation with the first embodiment. Also, as in the first embodiment, the containers 1 are subjected to a pitch reduction in the exit area 76 before being transferred to a capping wheel 84.

The empty mold 26 is returned in the opened position to the loading area by the second circular portion 50.

The extension devices 94 are also retrieved from the formed containers 1 in the retrieving area or in the exit area 76 and are returned to the area where they are attached to the preforms. According to the embodiment wherein the extension devices 94 area attached to the molds 26, the extension device 94 is spaced from the mold 26 when the mold 26 is opened such that the container 1 can be retrieved from the mold 26 and the extension device 94 follows the same path as the mold 26 to the loading area 62.

In the second embodiment, as in the first embodiment, the exit junction 60 between the first straight portion 48 and the second circular portion 50, which extends immediately downstream of the first straight portion 48, forms the separation point where the mold 26 follows the path defined by the first closed loop 18 while the formed and filled container 1 follows a different path defined by the exit area 76. The container 1 is therefore completely extracted from the mold at the end of the retrieving area 68 formed by the downstream end of the first straight portion 48.

As mentioned previously, the machine of the second embodiment is subjected to less mechanical constraint than the machine of the first embodiment, while the number of active forming stations 24 is reduced relative to the machine of the first embodiment. The integration of the holding means in the forming stations 24 remains quite simple since the holding means are formed by the whole molds 26, which simply have to be placed under the injection means 28 to form the forming stations 24.

A third embodiment, wherein the machine is subjected to even lesser mechanical constraints, will now be described in reference to FIGS. 3 and 4.

In the third embodiment of the machine, the main stations 86 are formed by the injection means 28 and by a main part of the molding cavity 34, while the elementary stations 88 are formed by holding means 106 forming a complementary part of the molding cavity 34. In other words, instead of being formed by the entire mold 26 as in the second embodiment, each elementary station 88 is formed by a much smaller part of said mold 26, while the major part of the mold 26 remains attached to the injection means 28. According to this third embodiment, the main stations 86 move along a second closed loop 90 and the elementary stations 88 move along the first closed loop 18, the second closed loop 90 and the first closed loop 18 having a common part defining the forming area 64, as in the second embodiment. As in the second embodiment, the second closed loop 90 is defined by the periphery of the first wheel 20, which means that the second closed loop 90 has a circular shape defined by the circle forming the periphery of the first wheel 20. The distinct part of the first closed loop 18 extends outside the periphery of the first wheel 20 and is not formed by the periphery of said first wheel 20. In other words, the elementary stations 18 are detached from the first wheel 20 when said elementary stations circulate in the distinct part of the first closed loop.

Figure 7:
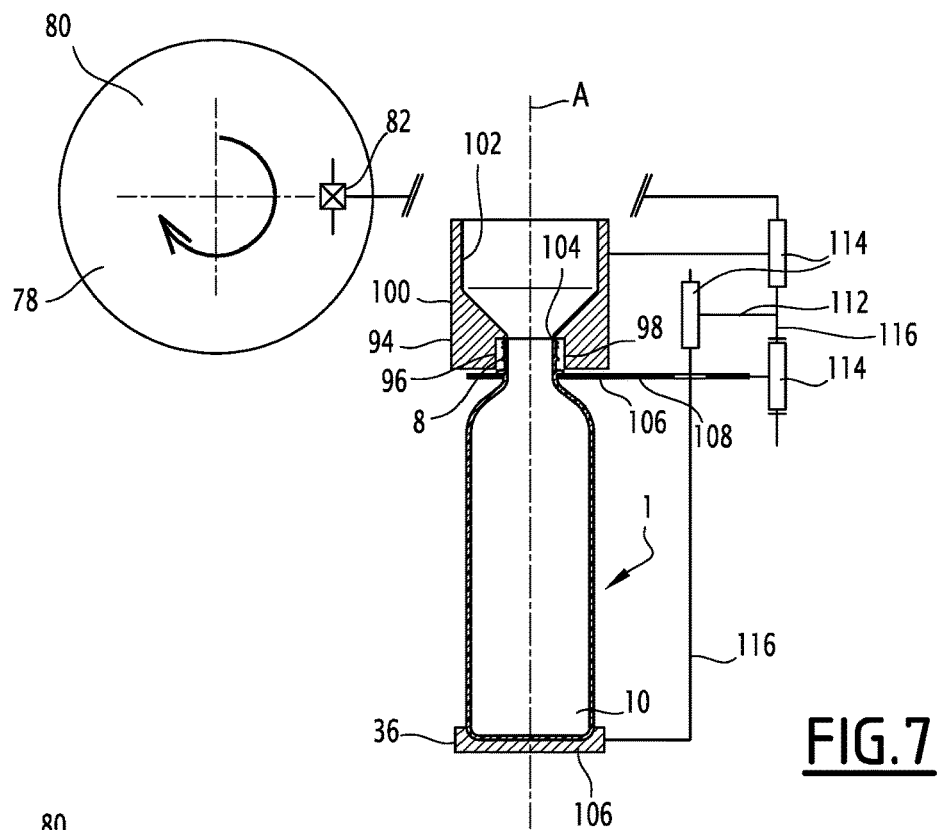

Each elementary station 88 comprises holding means 106 arranged to hold the formed containers 1 in the vicinity of their neck 8 and in the vicinity of their bottom 10, as shown in FIGS. 7 and 8. The holding means 106 for example comprise a neck holding fork 108 and the bottom part 36 of the mold 26, described previously. According to a variant, the bottom part 36 can be replaced by a bottom holding fork (not shown).

Each neck holding fork 108 is arranged to hold the neck 8 for example by encircling the part of the container 1 underneath the neck 8 such that the neck 8 can rest on the neck holding fork 108. Consequently, the neck holding fork 108 is also adapted to carry a preform 2 by its neck 8, as shown in FIG. 5. Each neck holding fork 108 is for example formed by two branches 110 movable relative to each other between an opened position (reference 110*a* in FIGS. 3 and 4), wherein the branches 110 are spaced from each other such that a preform 2 can be inserted between the branches 110 and a container 1 can be retrieved from the neck holding fork 108, and a closed position (reference 110*b* in FIGS. 3 and 4), wherein the branches 110 are moved close from each other such as to encircle the preform 2 or the container 1 underneath its neck 8.

The bottom part 36 forms a holding surface having the shape of the container 1 to be formed and furthermore arranged to support the formed and filled container 1 while the bottom 10 of the container 1 rests on the holding surface. If a bottom holding fork is provided, it can be formed by two branches arranged to encircle a part of the body of the container 1 in the vicinity of its bottom 10. In the rest of the description, the holding means 106 will be described with the bottom part 36 shown in the figures.

The neck holding fork 108, the bottom part 36 and the neck extension device 94 are movable relative to each other in the direction of axis A such that the distance between the neck holding fork 108 and the bottom part 36, on the one hand, and the distance between the neck holding fork 108 and the neck extension device 94, on the other hand, can be adjusted. The movements of the neck holding fork 108, of the bottom part 36 and of the neck extension device 94 are controlled by actuation means 112. Such actuation means 112 comprise actuators 114 needed to move the bottom part 36, the neck holding fork 108 and the neck extension device 94 relative to each other and connecting rods 116 extending along axis A, connecting the bottom part 36 to the neck holding fork 108 and the neck holding fork 108 to the neck extension device 94.

The main station 86 comprises at least the injection means 28, the two parts 30 and 32 of the mold 26 and the actuation means of the injection means 28 and of the mold 26. As mentioned previously, the main stations 86 are all carried by the first wheel 20 the periphery of which defines the second closed loop 90, as mentioned previously.

The holding means 106 are furthermore movable relative to the main station 86 between a coupled position and a decoupled position. In the coupled position, the bottom part 36 forms the bottom part of the mold 26 while the neck holding fork 108, in the closed position, defines the upper opening of the mold 26 through which the preform extends to be placed in the molding cavity 34. Consequently, in the coupled position, the bottom part 36 is placed under the two parts 30 and 32 of the mold 26 and the neck holding fork 108 is placed over the two parts 30 and 32 of the mold 26, said two parts 30 and 32 of the mold 26 being in the closed position, the bottom part 36, the two parts 30 and 32 and the neck holding fork 108 being in fluid tight contact with each other in order to form the molding cavity 34 as shown in FIG. 5. The holding means 106 are then integrated in the forming stations 24.

In the decoupled position, the two parts 30 and 32 of the mold are placed in the opened position and the holding means 106 and their actuation means 112 are separated from said two parts 30 and 32 of the mold 26.

For the actuation means 112 to be able to move from the coupled position to the decoupled position without interfering with the two parts 30 and 32 of the mold 26, the actuation means 112 are arranged such that the actuators 114 are all arranged above the two parts 30 and 32 of the mold 26. Furthermore, the rod 116 is arranged to be is arranged to be received in a slot (not shown) of the main station 86, said slot extending between the molding cavity 34 and the hinge connecting the two parts 30 and 32, said hinge being shown diagrammatically under reference 118 in FIGS. 5 and 6. With such an arrangement, it is possible for connection rod 116 to move between the two parts 30 and 32 of the mold 26 when said parts 30 and 32 are in the opened position without interfering with the two parts 30 and 32 and it is possible to move the two parts 30 and 32 in the closed position when the connecting rod 116 is received in the corresponding slot, without impairing the tightness of the molding cavity 34.

Figure 6:
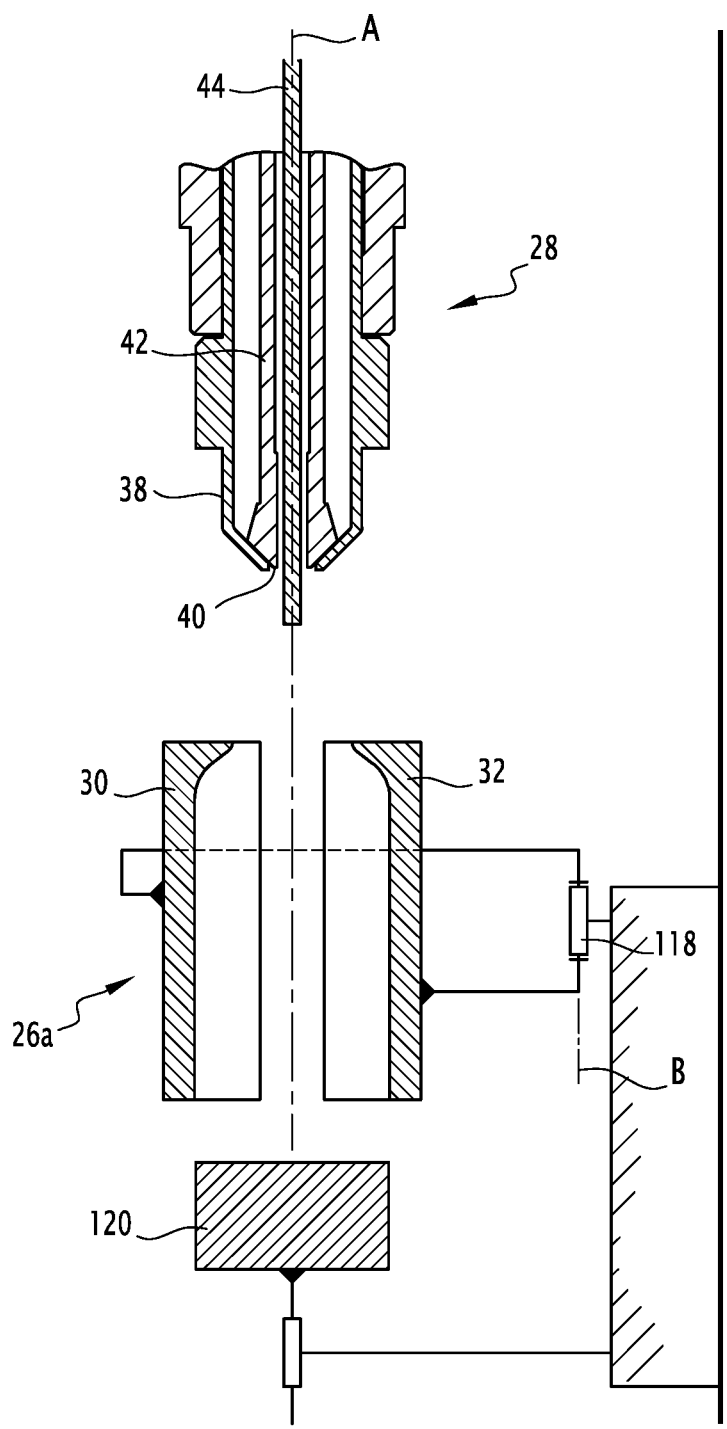

According to the embodiment shown in FIGS. 5 and 6, the main station 88 further comprises a support element 120 arranged to be placed under the bottom part 36 to apply said bottom part 36 against the two parts 30 and 32 of the mold 26 in the coupled position (FIG. 5) and receiving for example bottom cooling means, such as an hydraulic duct wherein water is circulated to cool the bottom of the formed container 1. The support element 120 is movable according to axis A relative to the two parts 30 and 32 of the mold such that it can be spaced from said two parts 30 and 32 in the opened position, as shown in FIG. 6) in order to be able to move the bottom part 36 between the coupled and decoupled positions without interfering with the main station 86.

According to a first variant of the third embodiment, shown in FIG. 3, the first closed loop 18 has substantially the same shape as in the second embodiment, meaning that the second wheel 22 has a diameter inferior to the first wheel 20 and that the second straight portion 52 extends substantially rectilinearly between the second wheel 22 and the first wheel 20 and forms an angle with the first straight portion 48. According to the first variant, the loading area 62 is placed in the second straight portion 52 just before the elementary stations 88 reach the first circular portion 46, as in the second embodiment. However, it is to be understood that the loading area 62 could be placed more upstream, for example in the second circular portion 50 of the first closed loop, as in the first embodiment.

The elementary stations 88 are moved along the first and the second straight portions 48, 52 by cooperating with worm gears 80, said worm gears having a variable pitch. Therefore, the pitch between two adjacent elementary stations 88 decreases progressively along the first straight portion 48, from the junction 54 to the first wheel 20 to the exit junction 60 of the second wheel 22. The conveyor 74 catches the formed and filled containers 1 from the holding means 106 and continues through the exit area 76 of the machine toward the capping station 84. In that embodiment, the neck extension device 94 can be retrieved after the speed of the container being already reduced. Once the neck extension device 94 is retrieved from the container there is no more speed variation and the travel of the filled container can be safe without spilling.

According to a second variant of the third embodiment, shown in FIG. 4, each of the elementary station 88 is attached to an independent magnetic carrier, magnetically driven by a magnetic path (not shown for clarity). Such a transportation means allow the carrier to move along a curve with a controllable and variable speed. This allows pitch reduction before the exit area 76, as in the first variant. The second wheel 22 still has a diameter inferior to the first wheel 20 but part of the second straight portion 52 is substantially parallel to the first straight portion 48. The parallel part of the second straight portion 52 extends downstream of the junction 58 between the second circular portion 50 and the second straight portion 52. The first closed loop 18 then comprises a joining portion 122 forming part of the second straight portion 52 and joining the parallel part of the second straight portion 52 to the first circular portion 46 and wherein the conveyor 19 is made tangential to the first wheel 20. The joining portion 122 then forms an angle with the first straight portion 48. According to this variant, the coupling between the elementary stations 88 and the main stations 86 therefore occurs "earlier" than in the first variant, i.e. more upstream on the first wheel 20. Consequently, according to this second variant, the common part between the first closed loop 18 and the second closed loop 90 is larger than in the first variant, which enables to increase the number of active forming stations. According to this variant, the junction 56 between the second straight portion 52 and the first circular portion 46 is considered as being the junction between the joining portion 122 and the first circular portion 46. According to the second variant, the loading area 62 is formed in the second straight portion 52 just before the elementary stations 88 reach the joining portion 122. However, it is to be understood that the loading area 62 could be placed more upstream, for example in the second circular portion 50 of the first closed loop, as in the first embodiment. The first closed loop comprises a concave area, meaning that in the concave area the radius of curvature of the loop is directed towards the outside of the first closed loop. This allows increasing the number of the forming station in the forming area 64.

The functioning of the machine is substantially the same in the first and second variants of the third embodiment.

In the loading area 62, after the preforms 2 have been passed through the oven 14, the successive preforms 2 are introduced in the neck holding forks 108, which are in the opened position. The neck holding forks 108 are then placed in the closed position in order to hold the preforms 2 and the extension devices 94 are moved to be placed on the necks 8 of the successive preforms 2.

The holding means 106 then move to the junction 56 between the second straight portion 52 and the first circular portion 46, where the holding means 106 are coupled with the main stations 86, i.e. the holding means 106 are moved between the two parts 30 and 32 of the mold 26 and the mold 26 is moved in the closed position, such that the holding means 106 are integrated in the forming stations 24. The injection means 28 are then actuated to move their injection nozzle 38 in active position. The main station 86 and the elementary station 88 are then in the configuration shown in FIG. 5 and form an active forming station 24.

The forming and filling steps of the containers 1 from the preforms 2 are then performed while the active forming stations 24 are moved along the first circular portion 46. The forming and filling steps have already been described in relation with the first embodiment and will not be described again. As in the second embodiment, the extension device 94 can help in the correct positioning of the injection nozzle 38 relative to the preform 2 since the extension device 94 can receive the injection nozzle 38 as shown in FIG. 5. Furthermore, as described previously, the extension device 94 is able to protect the neck 8 against deformation during the injection of the forming fluid at high pressure and during the filling of the container.

At the end of the first circular portion 46, the injection means are actuated to move the injection nozzle 38 in the retracted position such that the mold 26 can then be moved in the opened position.

At the junction 54 between the first circular portion 46 and the first straight portion 48, the holding means 106 are decoupled from the main stations 86 and are moved along the first straight portion 48 while the main stations 86 return towards the junction 56 between the second straight portion 52 and the first circular portion 46 as described previously. This means that, as in the second embodiment, the first straight portion 48 extends downstream of the forming area 64. It should be noted that, at the junction 54, the orientation of the two parts of the mold 26 and of the holding means 106 is arranged such that the movement of the holding means 106 on the first straight portion 48 does not interfere with the movement of the two parts 30 and 32 of the mold 26. Consequently, the coupling and decoupling of the holding means 106 to and from the main stations 86 require a particular cinematic, which is more complex than in the first and second embodiments.

It should be noted that the forming area 64 of the machine according to the third embodiment may be reduced relative to the second embodiment, since the upstream part of the first circular portion 46 is used to close the mold 26 and to place the injection nozzle 38 in the active position, while the downstream part of the first circular portion is used to place the injection nozzle 38 is the retracted position and to open the mold 26. For example, for a first wheel carrying twenty main stations 86, six active forming stations 24 can be formed in the first variant of the third embodiment. It should be noted that the number of active forming stations 24 can be slightly increased with the second variant of the third embodiment bringing the number of active forming stations to eight for a first wheel carrying twenty main stations 86.

Prior to reaching the junction 54 between the first circular portion 46 and the first straight portion 48, the injection nozzle 38 has to be placed in the retracted position and the mold 26 has to be opened in order to allow the holding means 106 to be decoupled from the main station 86 at said junction 54. This means that when the holding means 106 reach the junction 54 and moves to the first straight portion 48, the container 1 is not closed by the injection nozzle 38 although a centrifugal force is applied on the liquid in the container. The extension device 94, by extending the length of the neck 8, prevents the liquid from being spilled outside the container 1 when said container 1 is not closed.

More particularly, when the containers 1 are moved in rotation at high speed, the centrifugal force tends to displace the liquid outside the container 1. Thanks to the extension device, the liquid in maintained in the extension part 100 of the extension device 94. Therefore, the liquid is not spilled outside the container 1 even when said container is subjected to high speeds and important centrifugal forces. Consequently, the rotation speeds and transfer speeds of the machine can be increased for improving the throughput of the machine.

When the holding means 106 move along the stabilization area 66 and hold a formed and filled container 1, the liquid inside the extension part 100 of the extension device 94 has time to return inside the container 1 since the liquid is no longer subjected to a centrifugal force on the first straight portion 48. The particular conical shape of the inner wall 102 of the extension part 100 guaranties that the liquid will flow inside the container 1 and will not remain trapped in the extension device 94. A coating of hydrophobic material can also help to guaranty the return of the liquid inside the container 1.

It should be noted that, since the container 1 is held by the bottom part 36 in addition to the neck holding fork 108, there is no risk of deformation of the container 1 while it is moved at high speed in the first straight portion even if the container 1 is not completely held by a mold 26.

A difference between the third embodiment and the first and second embodiments is that, since the holding means 106 are far less cumbersome than the forming stations and than the molds 26, the reduction of the pitch between successive containers can occur in the retrieving area 68 instead of occurring in the exit area 76. This can be done by placing the worm gear 80 upstream of the exit junction 60 between the first straight portion 48 and the second circular area 50 instead of placing it downstream of said exit junction 60. This pitch reduction in the first closed loop 18 instead of outside the first closed loop 18 makes the machine less cumbersome since the length of the exit area 76 can be reduced, as can be seen by comparing FIGS. 1 and 2 to FIGS. 3 and 4. However, since the pitch between the successive holding means 106 is performed in the first closed loop 18, the pitch has to be increased again prior to coupling the holding means 106 with the main stations 86. This can be obtained by placing a worm gear 124 parallel to the second straight portion 52, the holding means 106 being arranged to mesh with said worm gear 124 and said worm gear 124 being arranged to increase the distance between successive holding means 106, as shown in FIG. 3.

In the retrieving area 68, the holding means 106 and the extension device 94 are moved to free the container 1 while the extraction fork 72 is moved to its active position to hold the container 1 as shown by FIGS. 7 to 9. The extension device 94 is first moved away from the neck 8 of the container 1, while the extraction fork 72 is placed under the neck 8 of said container 1, as shown in FIG. 8. Then, the distance between the bottom part 36 and the neck holding fork 108 along axis A is increased to free the container 1 while said container is held by the extraction fork 72 as shown in FIG. 9.

The empty holding means 106 are then returned to the loading area 62 via the second circular portion 50, the neck holding fork 108 being maintained in its opened position to be ready to receive a new preform. As mentioned previously, the pitch between the successive holding means 106 is increased again during this step.

The formed and filled containers 1 are moved in the exit area 76 to the capping wheel 84 as in the first and second embodiments.

According to the third embodiment, the junction 54 between the first circular portion 46 and the first straight portion 48, which extends immediately downstream of the first circular portion 46, forms the separation point where the mold 26 follows the path defined by the second closed loop 90 while the formed and filled container 1 follows a different path defined by the first straight portion 48. The junction 54 therefore forms a separation junction 54. The container 1 is therefore completely extracted from the mold at the beginning of the stabilization area 66 formed by the upstream end of the first straight portion 48.

In the machine according to all the embodiments described above, the formed and filled containers are circulated on a substantially rectilinear portion after having been formed and filled on a circular portion since the first straight portion 48 extends at least in part downstream of the forming area 64. This rectilinear portion allows preventing the liquid from being spilled out of the containers even though said containers are not closed by forming a stabilization area wherein the liquid in the containers has time to settle while the containers are being maintained at least by their neck and bottom.

The overall configuration of the first closed loop 18 has been given by way of example only, and other configurations can be implemented. For example, the second straight portion 52 can be arranged to pass over the first straight portion 48. The first closed loop has substantially the shape of an "eight". For example, the axis of rotation of the wheels could form a small angle between each other. According to other possibilities, more than two circular and/or straight portions can be foreseen in the first closed loop.

As mentioned previously, the machine could be adapted to a simple filling machine, simply by replacing the forming stations with known filling stations and by loading the machine with already formed containers. In this case, the holding means described with the third embodiment are used to move the containers in the machine and the molds are not needed.

In another variant (not illustrated) of the first or second variants of the third embodiment, the holding means 106 of an elementary station 88 only includes the neck holding fork 108, but does not have the bottom part 36 of the mold, and does not have any bottom holding means holding the container in the vicinity of its bottom. However, the elementary station 88 still has an extension device 94, or any spilling protection device. Additionally, the main station 86, according to that variant, includes a movable arm provided with a bottom holding means adapted to hold the vicinity of the bottom. The mold opening sequence for that variant is the same as what has been described with reference to FIGS. 3 and 4, in a sense that the mold opens during the first circular portion 46, just before the separation junction 54. During the mold opening, said bottom holding means still holds the bottom of the container 1, and this up to and including the separation junction 54. Then, during a short period of time starting immediately after the separation junction 54, the movable arm moves the bottom holding means with respect to the main station 86, so as to follow the first straight portion 48. That short period of time is mainly used for retrieving the bottom holding means from the container bottom, without interfering with it. Then, the filled container 1 continues its travel along the stabilisation area 66 while the bottom holding means is moved back to its main station 86.

The invention claimed is:

1. A machine for forming and filling successive containers from preforms in successive molds with liquid, the machine comprising at least a first closed loop, and a plurality of holders, each holder being configured to hold a neck of a preform or of a formed and filled container, the holders being distributed along the first closed loop, the machine further comprising a conveyor configured to convey the holders along the first closed loop in a conveying direction, the first closed loop including a forming area along which each holder circulating in the forming area is integrated in a forming station, the forming station including a mold receiving a preform held by the holder, and an injector configured to inject a liquid inside the preform held by the holder such that the preform held by the holder is shaped into a container, the first closed loop including a first straight portion extending rectilinearly and a first circular portion upstream of the first straight portion, the forming area including the first circular portion.

2. A machine for forming and filling containers according to claim 1, wherein the first straight portion of the first closed loop is arranged such that the formed and filled containers are circulated on said first straight portion.

3. A machine for forming and filling containers according to claim 1, wherein the first straight portion of the first closed loop extends at least in part downstream of the forming area.

4. A machine for forming and filling containers according to claim 1, wherein the first closed loop further comprises at least a separation area, wherein each container formed and filled inside a mold is separated from the mold, the separation area being arranged directly upstream or directly downstream of the first straight portion.

5. A machine for forming and filling containers according to claim 4, wherein the separation area comprises a separation point, downstream of which the molds and the filled containers circulate along different paths, the separation point being formed by the upstream end or by the downstream the end of the first straight portion of the first closed loop.

6. A machine for forming and filling containers according to claim 1, wherein the holders are arranged to hold each container at least in the vicinity of its neck and at least in the vicinity of its bottom, at least when the holders circulate on the first straight portion of the first closed loop.

7. A machine for forming and filling containers according to claim 1, wherein said first straight portion extending according to a direction forming a tangent of the first circular portion at the junction between the first circular portion and the first straight portion.

8. A machine for forming and filling containers according to claim 1, wherein the forming stations are distributed along the entire first closed loop.

9. A machine for forming and filling containers according to claim 1, wherein the injectors are distributed along a second closed loop, the second closed loop and the first closed loop comprising at least one common part, the common part defining the forming area.

10. A machine for forming and filling containers according to claim 9, wherein the molds are distributed along the entire first closed loop, the molds being coupled to the injectors in the forming area and being separated from the injectors outside the forming area.

11. A machine for forming and filling containers according to claim 7, wherein the holders are constituted by a part of the mold.

12. A machine for forming and filling containers according to claim 9, wherein the molds are distributed along the second closed loop and remain coupled to the injectors along the second closed loop, the preforms being received by the molds at one end of the forming area and the formed and filled containers being separated from the molds at the other end of the forming area.

13. A machine for forming and filling containers according to claim 1, wherein the first closed loop comprises:

a second circular portion extending downstream of the first straight portion, and a second straight portion extending between the second circular portion and the first circular portion, the machine further comprising an exit conveyor located in an exit area of the machine and adapted to extract formed and filled containers from the first closed loop.

14. A machine for forming and filling containers according to claim 13, wherein the exit conveyor comprises a substantially rectilinear portion aligned with the first straight portion;

and/or wherein the exit area is located at the junction between the first straight portion and the second circular portion of the first closed loop.

15. A machine for forming and filling containers according to claim 13, wherein the conveyor is configured to convey the holders with a constant pitch along the first closed loop, or with a predetermined variation of pitch along the first closed loop;

and/or wherein the conveyor comprises a plurality of mechanical links connecting two adjacent ones of the holders such that the plurality of holders and the plurality of mechanical links form a deformable chain extending along the first closed loop;

and/or wherein the conveyor comprises at least a fix magnetic path extending along at least a magnetic portion of the first closed loop, each of the holders being carried by an independent carrier adapted to be driven magnetically along the fix magnetic path.

16. A machine for forming and filling containers according to claim 13, wherein the first circular portion and the second circular portion are each formed by part of a wheel, moving in rotation around an axis which is substantially perpendicular to a plane containing the first closed loop;

and/or wherein the wheel forming the second circular portion has a smaller diameter than the wheel forming the first circular portion, such that at least part of the second straight portion forms an angle with the first straight portion.

17. A method for forming and filling containers, the method comprising the following steps:

providing a machine for forming and filling containers having at least a first closed loop and a plurality of holders, each holder being configured to hold a neck of a preform or of a formed and filled container, the holders being distributed along the first closed loop, the machine further including a conveyor configured to convey the holders along the first closed loop in a conveying direction, the first closed loop including a forming area along which each holder circulating in the forming area is integrated in a forming station, the forming station including a mold receiving a preform held by the holder and an injector configured to inject a liquid inside the preform held by the holder such that the preform held by the holder is shaped into a container, the first closed loop including at least one straight portion extending rectilinearly and a first circular portion upstream of the first straight portion, the forming area including the first circular portion;

feeding successive preforms to successive ones of the holders, such that each holder holds a preform by its neck;

circulating the successive holders holding the preforms in the forming area of the machine, the preforms being placed in successive molds and the molds being coupled to the injectors for injecting a liquid inside the preforms placed in the molds to shape the preforms into containers in the forming area such that formed and filled containers are obtained at the end of the forming area, retrieving formed and filled containers at an exit area of the machine, wherein the formed and filled containers are circulated on the first straight portion of the first closed loop defined by the machine before being retrieved from the machine at the exit area.

* * * * *